United States Patent
Wang et al.

(10) Patent No.: US 12,058,542 B2
(45) Date of Patent: Aug. 6, 2024

(54) SYNCHRONIZATION SIGNAL BLOCK BASED BEAM FAILURE DETECTION

(71) Applicant: Apple Inc., Cupertino, CA (US)

(72) Inventors: Guotong Wang, Beijing (CN); Hua Li, Beijing (CN); Manasa Raghavan, Sunnyvale, CA (US); Yushu Zhang, Beijing (CN); Jie Cui, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 17/293,429

(22) PCT Filed: Nov. 11, 2019

(86) PCT No.: PCT/US2019/060711
§ 371 (c)(1),
(2) Date: May 12, 2021

(87) PCT Pub. No.: WO2020/102072
PCT Pub. Date: May 22, 2020

(65) Prior Publication Data
US 2022/0022065 A1   Jan. 20, 2022

Related U.S. Application Data

(60) Provisional application No. 62/760,276, filed on Nov. 13, 2018.

(51) Int. Cl.
*H04W 24/08* (2009.01)
*H04L 5/00* (2006.01)

(52) U.S. Cl.
CPC ........... *H04W 24/08* (2013.01); *H04L 5/0048* (2013.01)

(58) Field of Classification Search
CPC ............. H04W 24/08; H04W 72/0453; H04L 5/0048; H04L 5/0007; H04L 5/005; H04B 5/0025; H04B 7/0695
See application file for complete search history.

(56) References Cited

U.S. PATENT DOCUMENTS

2018/0302889 A1   10/2018   Guo et al.
2019/0245737 A1*   8/2019   Zhou ................... H04B 7/06

FOREIGN PATENT DOCUMENTS

CA   3058218 A1   10/2018
CN   1901468 A    1/2007
(Continued)

OTHER PUBLICATIONS

International Search Report directed to related International Application No. PCT/US2019/060711, mailed Apr. 9, 2020, 2 pages.
(Continued)

*Primary Examiner* — Dady Chery
(74) *Attorney, Agent, or Firm* — Sterne, Kessler, Goldstein & Fox P.L.L.C.

(57) ABSTRACT

Systems, apparatuses, methods, and computer-readable media are provided for performing Beam Failure Detection (BFD), and in particular, for performing Synchronization Signal Block (SSB) based BFD and/or Channel State Information Reference Signal (CSI-RS) based BFD. Disclosed embodiments include quasi co-location (QCL) and use case restrictions for SSB for BFD and Physical Downlink Control Channel (PDCCH), transition period handling for BFD, and implicit configuration SSB for BFD. Other embodiments may be described and/or claimed.

19 Claims, 8 Drawing Sheets

(56) References Cited

FOREIGN PATENT DOCUMENTS

| CN | 101848114 A | 9/2010 |
|---|---|---|
| CN | 103138957 A | 6/2013 |
| CN | 108702767 A | 10/2018 |
| EP | 3146741 A1 | 3/2017 |
| WO | 2018174667 A1 | 9/2018 |
| WO | 2018174806 A1 | 9/2018 |
| WO | 2018203785 A1 | 11/2018 |

OTHER PUBLICATIONS

Mediatek Inc., 'Summary on Beam Failure Recovery', R1-1811867, 3GPP TSG RAN WG1 Meeting #94bis, Chengdu, China, Oct. 9, 2018 sections 2.4, 2.6, 3.2, 3.5.

3GPP; TSG RAN; NR; NR and NG-RAN Overall Description; Stage 2 (Release 15)', 3GPP TS 38.300 V15.3.1, Oct. 7, 2018 section 9.2.8.

Intel Corporation, 'Remaining Issues on Beam Management', R1-1810751, 3GPP TSG RAN WG1 Meeting #94bis, Chengdu, China, Sep. 29, 2018 sections 3.1-3.7.

Huawei et al., 'Further discussion on BFD requirements', R4-1815174, 3GPP TSG RAN WG4 Meeting #89, Spokane, US, Nov. 2, 2018 sections 2.1-2.3.

Notification of the First Office Action, dated Aug. 21, 2023, from Chinese Patent Application No. 2019800732725, 17 pages with translation.

First Examination Report, dated Dec. 8, 2022, from Indian Patent Application No. 202117026183, 5 pages.

Fujitsu, "Discussion on beam failure recovery procedure," 3GPP TSG RAN WG1 NR Ad-Hoc#2, Qingdao, P.R. China, Jun. 27-30, 2017, R1-1710236, 4 pages.

NTT DOCOMO et al., "WF for handling partial beam failure," 3GPP TSG RAN WG1 #91, Reno, USA, Nov. 27-Dec. 1, 2017, R1-1721673, 3 pages.

Notice of Grant directed to related Chinese Application No. 201980073272.5, with English-language machine translation attached, mailed Feb. 29, 2014; 8 pages.

Samsung, Huawei, HiSilicon, "Remaining issues on NR CSI-RS," 3GPP TSG RAN WG1 Meeting #89, Hangzhou, China, May 15-19, 2017, R1-1707981; 15 pages.

Huawei, HiSilicon, "Beam failure recovery," 3GPP TSG RAN WG1 Meeting #89, Hangzhou, China, May 15-19, 2017, R1-1708135; 9 pages.

Zhang et al., "Use BFD technology to detect network faults," with English-language machine translation attached, dated Oct. 5, 2017; 10 pages.

* cited by examiner

SYNCHRONIZATION SIGNAL BLOCK BASED BEAM FAILURE DETECTION

RELATED APPLICATIONS

The present application is a national stage entry of PCT/US2019/060711 filed on Nov. 11, 2019, entitled "Synchronization Signal Block Based Beam Failure Detection," which claims priority to U.S. Provisional App. No. 62/760,276, filed Nov. 13, 2018, the contents of both of which are hereby incorporated by reference in their entireties.

FIELD

Various embodiments of the present application generally relate to the field of wireless communications, and in particular, to enhancements to Radio Link Monitoring and/or Beam Failure Detection (BFD).

BACKGROUND

The next generation wireless communication systems, referred to as Fifth Generation (5G) or new radio (NR) systems, includes Radio Link Monitoring and Link Recovery Procedures functions where a user equipment (UE) monitors downlink radio link quality for the purpose of indicating out-of-sync and in-sync statuses to higher layers. The reported out-of-sync and in-sync statuses are used for detecting radio link failures. 5G/NR systems also include beam failure detection (BFD) functions where a UE is explicitly or implicitly configured with BFD reference signals (RSs) and the UE declares a beam failure when a number of beam failure instance indications from the physical layer reaches a configured threshold before a configured timer expires. The BFD RSs can be based on either periodic Channel State Information Reference Signal (CSI-RS) or Synchronization Signal Blocks (SSBs) where the RSs can be either configured. When BFD RSs are not configured, the RS configured in a Transmission Configuration Indication (TCI) state for Physical Downlink Control Channel (PDCCH) can be used for BFD.

The RSs for BFD could be Quasi-Co-Located (QCLed) with a corresponding Demodulation RS (DMRS) for PDCCH. However, only CSI-RS can be configured in the TCI state for DMRS for PDCCH. The configuration of QCL information between an explicitly configured SSB and the DMRS for PDCCH is not defined. Additionally, the PDCCH TCI state can be updated by Media Access Control (MAC) Control Element (CE), but the explicitly configured SSB and periodic CSI-RS or QCL of the periodic CSI-RS can only be updated by Radio Resource Control (RRC) signaling. This could cause a QCL mismatch transition period, and the BFD to be performed for this period is not defined. Furthermore, since the SSB cannot be configured in a TCI state for PDCCH, the implicit configuration of the SSB based BFD is not defined.

DETAILED DESCRIPTION

Embodiments discussed herein provide enhancements to existing Beam Failure Detection (BFD) procedures. In particular, the present disclosure provides embodiments for Synchronization Signal Block (SSB) based BFD. Embodiments include quasi co-location (QCL) and use case restrictions for SSB for BFD and Physical Downlink Control Channel (PDCCH), transition period handling for BFD, and implicitly configuring SSB for BFD. Other embodiments may be described and/or claimed.

Figure 1:
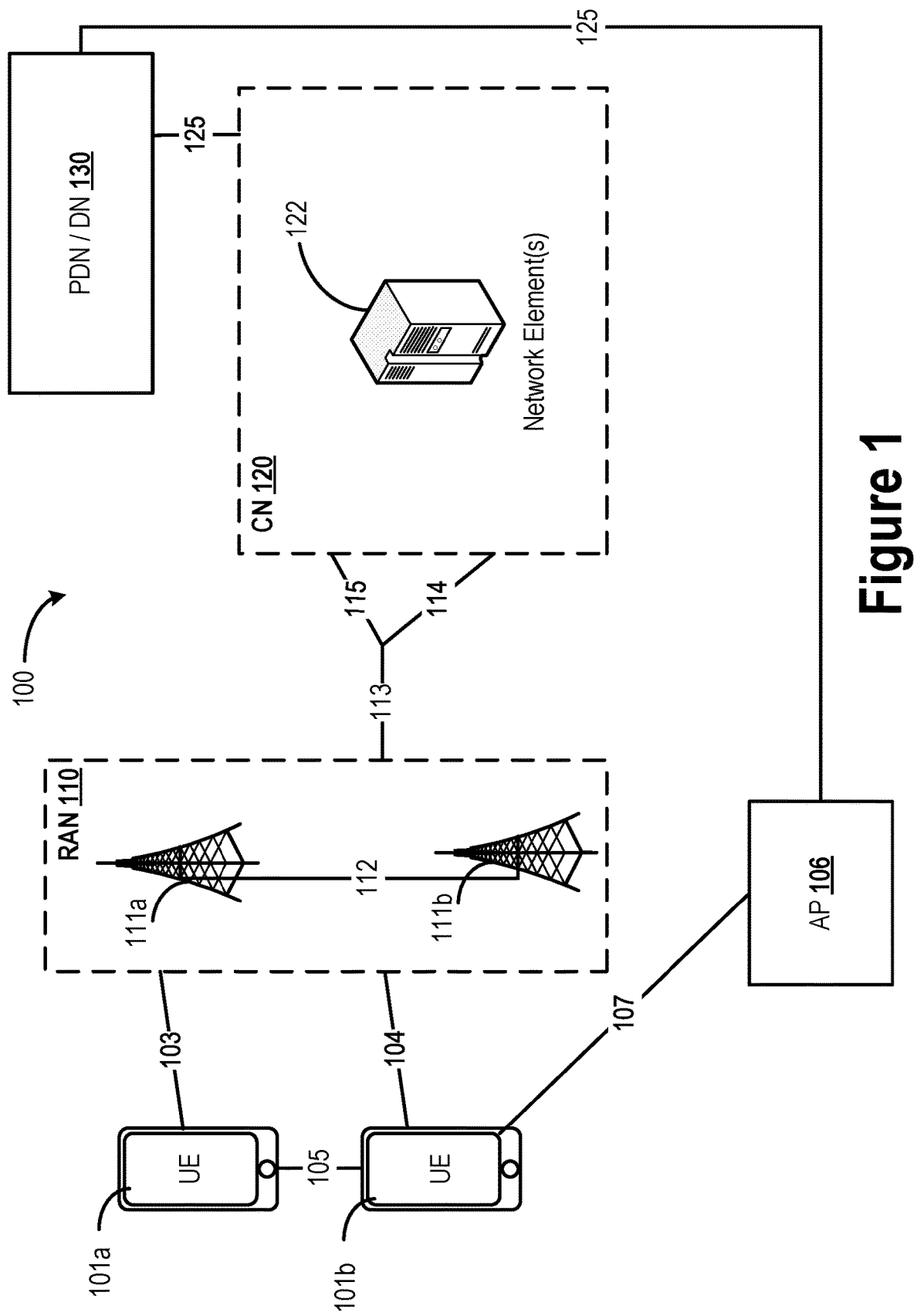
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the Fifth Generation (5G) or New Radio (NR) system standards or Long Term Evolution (LTE) system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., Wireless Metropolitan Area Network (WMAN), Worldwide Interoperability for Microwave Access (WiMAX), etc.), or the like.

As shown by FIG. 1, the system 100 includes user equipment (UE) 101a and UE 101b (collectively referred to as "UEs 101" or "UE 101"). A UE 101 is any device with radio communication capabilities, such as a wireless communications interface, and describes a remote user of network resources in a communications network. In this example, UEs 101 are illustrated as smartphones, but may also comprise any mobile or non-mobile computing device, such as consumer tablet computers, wearable devices, desktop computers, laptop computers, in-vehicle infotainment (IVI) devices, head-up display (HUD) devices, Internet of Things (IoT) devices, embedded systems or microcontrollers, networked or "smart" appliances, and/or the like. The UEs 101 include various hardware elements such as baseband circuitry, memory circuitry, radiofrequency (RF) circuitry, and interface circuitry (e.g., input/output (I/O) interfaces), some or all of which may be coupled with one another via a suitable interconnect (IX) technology. The RF circuitry includes various hardware elements (e.g., switches, filters, amplifiers, digital signal processors (DSPs), etc.) configured to enable communication with wireless networks using modulated electromagnetic radiation through a non-solid medium. The electronic elements may be arranged as receive signal path (or receiving (Rx) RF chain) to down-convert received RF signals and provide baseband signals to the baseband circuitry, and arranged as a transmit signal path to up-convert baseband signals provided by the baseband circuitry and provide RF output signals to an antenna array via a front-end module for transmission. The baseband circuitry and RF circuitry allow the UEs 101 to connect or communicatively couple with a Radio Access Network (RAN) 110. In various embodiments, the UEs 101 may have multiple panels or multiple antenna arrays, and are configured to receive multiple independently scheduled data streams from different TRPs 111 in a multiple-DCI based multi-TRP/panel transmission.

The UE 101*b* is shown to be configured to access an access point (AP) 106 via connection 107. The connection 107 can comprise a local wireless area network (WLAN) connection consistent with any IEEE 802.11 protocol, wherein the AP 106 may be a WiFi® router, gateway appliance, or the like. In this example, the AP 106 is shown to be connected to the Internet without connecting to the core network of the wireless system (described in further detail below). In various embodiments, the UE 101*b*, RAN 110, and AP 106 may be configured to utilize LTE-WLAN aggregation (LWA) operation and/or LTE/WLAN Radio Level Integration with IPsec Tunnel (LWIP) operation.

The RAN 110 is a set of RAN nodes 111 that implement a Radio Access Technology (RAT); the term "RAT" as used herein refers to a type of technology used for radio access such as NR, E-UTRA, WiFi/WLAN, and/or the like. The set of RAN nodes 111 in the RAN 110 are connected to one another via interface 112 and connected to the CN 120 through interface 113. In embodiments, the RAN 110 may be a Universal Terrestrial Radio Access Network (UTRAN) or Groupe Spécial Mobile (GSM)/Enhanced Datarates for GSM (EDGE) RAN (GERAN) when system 100 is an UTRAN or GERAN system, an Evolved UTRAN (E-UTRAN) when system 100 is an LTE or 4G system, or a next generation (NG) RAN or a 5G RAN when system 100 is an NR/5G system. The UEs 101 utilize connections (or channels) 103 and 104, respectively, each of which comprises a physical communications interface or layer. The term "channel" or "link" as used herein refers to any transmission medium, either tangible or intangible, which is used to communicate data or a data stream. Additionally, the term "link" as used herein refers to a connection between two devices through a RAT for the purpose of transmitting and receiving information. In FIG. 1, the connections 103 and 104 are illustrated as an air interface to enable communicative coupling, and can be consistent with cellular communications protocols, such as GSM, Code-Division Multiple Access (CDMA), Push-to-Talk (PTT) and/or PPT over cellular (POC), UMTS, LTE, 5G/NR, and/or the like. The UEs 101 may also directly exchange data via a Proximity Services (ProSe) or sidelink (SL) interface 105 comprising one or more physical and/or logical SL channels.

The RAN 110 includes one or more RAN nodes 111*a* and 111*b* (collectively referred to as "RAN nodes 111" or "RAN node 111") that enable the connections 103 and 104. The RAN nodes 111 are infrastructure equipment that provide the radio baseband functions for data and/or voice connectivity between a network (e.g., core network (CN) 120) and one or more users (e.g., UEs 101). The RAN nodes 111 can be referred to as NodeBs 111 in UMTS systems, evolved NodeBs (eNBs) 111 in LTE systems, next generation NodeBs (gNBs) 111 or next generation eNBs (ng-eNBs) in 5G/NR systems, Road Side Units (RSUs) for vehicle-to-everything (V2X) implementations, and so forth. In some embodiments, each RAN node 111 may be a Transmission/Reception Point (TRP). In other embodiments, each RAN node 111 may have multiple antenna elements, where each antenna element may be an individual TRP.

The RAN nodes 111 can comprise ground stations (e.g., terrestrial access points) or satellite stations providing coverage within a geographic area (e.g., a cell). The RAN nodes 111 may be implemented as one or more dedicated physical devices such as a macrocell base stations, and/or a low power base stations for providing femtocells, picocells, or other like cells having smaller coverage areas, smaller user capacity, or higher bandwidth compared to macrocells. Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, UL and DL dynamic radio resource management and data packet scheduling, and mobility management.

In some embodiments, all or parts of the RAN nodes 111 may be implemented as one or more software entities running on server computers as part of a virtual network (e.g., a cloud RAN (CRAN), virtual baseband unit pool (vBBUP), or the like). In these embodiments, the RAN nodes 111 may implement a RAN function split where different protocol entities are operated by different elements. The term "element" as used herein refers to a unit that is indivisible at a given level of abstraction and has a clearly defined boundary. One or more RAN nodes 111 may represent individual distributed units (DUs) that are connected to centralized unit (CU) via respective F1 interfaces (not shown by FIG. 1). In these implementations, the gNB-DUs may include one or more remote radio heads or RFEMs, and the gNB-CU may be operated by a server that is located in the RAN 110 (not shown) or by a server pool in a similar manner as a CRAN/vBBUP.

The RAN nodes 111 may be configured to communicate with one another via interface 112. The interface 112 may include a user plane interface for carrying user plane data between the RAN nodes 111, and a control plane interface for carrying control signaling between the RAN nodes 111. The interface 112 may be an X2 interface 112 when the system 100 is an LTE system, and the interface 112 may be an Xn interface 112 when the system 100 is a 5G/NR system. In some embodiments, interface 112 may be a wireless backhaul connection.

In embodiments, the UEs 101 can be configured to communicate using Orthogonal Frequency Division Multiplexing (OFDM) communication signals with each other or with any of the RAN nodes 111 over a multicarrier communication channel in accordance with various communication techniques, such as, but not limited to, an OFDMA communication technique (e.g., for DL communications) or a Single Carrier Frequency Division Multiple Access (SC-FDMA) communication technique (e.g., for UL and ProSe/SL communications), although the scope of the embodiments is not limited in this respect. The OFDM signals can comprise a plurality of orthogonal subcarriers.

DL and UL transmissions may be organized into frames with 10 ms durations, where each frame includes ten 1 ms subframes, and each subframe includes an integer number of slots. Time-frequency radio resource grids may be used to indicate physical resources in the DL or UL in corresponding slots. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. There is one resource grid for a given antenna port p, subcarrier spacing (SCS) configuration $\mu$, and transmission direction (DL or UL). The frequency location of a subcarrier refers to the center frequency of that subcarrier. Each element in the resource grid for antenna port p and SCS configuration $\mu$ is called a resource element (RE) and is uniquely identified by $(k, l)_{p,\mu}$ where k is the index in the frequency domain (e.g., k is a subcarrier index relative to a reference or reference point) and l refers to the symbol position in the time domain relative to some reference point (e.g., l is an OFDM symbol index relative to a reference or reference point). RE $(k, l)_{p,\mu}$ corresponds to a physical resource and the complex value $a_{k,l}^{(p,\mu)}$. In other words, $a_{k,l}^{(p,\mu)}$ is the value of RE (k, l) for antenna port p and SCS configuration μ.

An antenna port is defined such that the channel over which a symbol on the antenna port is conveyed can be inferred from the channel over which another symbol on the same antenna port is conveyed. Two antenna ports are said to be quasi co-located (QCLed) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and/or spatial Rx parameters.

A collection of REs make up a resource block (RB), which is usually defined as $N_{sc}^{RB}=12$ consecutive subcarriers in the frequency domain. Physical RBs (PRBs) blocks for subcarrier configuration μ are defined within a bandwidth part (BWP) and numbered from 0 to $N_{BWP,i}^{size,\mu}-1$ where i is the number of the BWP. Virtual RBs (VRBs) are defined within a BWP and numbered from 0 to $N_{BWP,i}^{size,\mu}-1$ where i is the number of the BWP.

A BWP is a subset of contiguous common RBs for a given numerology $\mu_i$ in BWP i on a given carrier. The UE 101 can be configured with up to four BWPs in the DL with a single DL BWP being active at a given time. The UE 101 is not expected to receive PDSCH, PDCCH, or CSI-RS (except for RRM) outside an active BWP. The UE 101 can be configured with up to four BWPs in the UL with a single UL BWP being active at a given time. The UE 101 does not transmit PUSCH or PUCCH outside an active BWP. For an active cell, the UE 101 does not transmit SRS outside an active BWP.

Common RBs are numbered from 0 and upwards in the frequency domain for SCS configuration μ. The center of subcarrier 0 of common RB 0 for SCS configuration μ coincides with 'point A'. The relation between the common RB number $n_{CRB}^\mu$ in the frequency domain and resource elements (k, l) for SCS configuration μ is given by $$N_{CRB}^\mu = \left\lfloor \frac{k}{N_{sc}^{RB}} \right\rfloor,$$

where k is defined relative to point A such that k=0 corresponds to the subcarrier centered around point A.

Point A serves as a common reference point for RB grids and is obtained from the parameters offsetToPointA PCell DL and absoluteFrequencyPointA for all other cases. The parameter offsetToPointA represents the frequency offset between point A and the lowest subcarrier of the lowest RB, which has the SCS provided by the higher-layer parameter subCarrierSpacingCommon and overlaps with the SS/PBCH block used by the UE 101 for initial cell selection, expressed in units of RBs assuming 15 kHz SCS for FR1 and 60 kHz SCS for FR2. The parameter absoluteFrequencyPointA for all other cases where absoluteFrequencyPointA represents the frequency-location of point A expressed as in Absolute Radio-Frequency Channel Number (ARFCN).

There are several different physical channels and physical signals that are conveyed using RBs, PRBs, and/or individual REs. A physical channel corresponds to a set of REs carrying information originating from higher layers. Physical channels include physical UL channels (e.g., physical UL shared channel (PUSCH), physical UL control channel (PUCCH), physical random access channel (PRACH), etc.) and physical DL channels (e.g., physical DL shared channel (PDSCH), physical DL control channel (PDCCH), physical broadcast channel (PBCH), etc.). A physical signal is used by the physical layer (PHY) but does not carry information originating from higher layers. Physical signals include physical UL signals (e.g., Demodulation Reference Signal (DMRS or DM-RS), Phase-Tracking Reference Signal (PTRS), Sounding Reference Signal (SRS), etc.) and physical DL signals (e.g., DMRS, PTRS, Channel State Information Reference Signal (CSI-RS), Primary Synchronization Signal (PSS), Secondary Synchronization Signal (SSS), etc.).

The PDSCH carries user data and higher-layer signaling to the UEs 101, and the PDCCH carries DL resource assignment information for receiving the PDSCH. Each UE 101 monitors a set of PDCCH candidates on one or more activated serving cells as configured by higher layer signaling for control information (e.g., Downlink Control Information (DCI)), where monitoring implies attempting to decode a set of PDCCH candidates according one or more monitored DCI formats (e.g., DCI formats 0 through 6-2 as discussed in section 5.3.3 of 3GPP TS 38.212 v15.3.0 (2018 September) (hereinafter "TS 38.212"), DCI formats 0_0 through 2_3 as discussed in section 7.3 of TS 38.212, or the like). The DCI includes, inter alia, DL assignments and/or UL scheduling grants including, for example, modulation and coding format, resource allocation, and HARQ information, among other information/commands. Each UE 101 monitors (or attempts to decode) respective sets of PDCCH candidates in one or more configured monitoring occasions according to UE or cell-specific search spaces (for LTE/4G), or monitors (or attempts to decode) respective sets of PDCCH candidates in one or more configured monitoring occasions in one or more configured Control Resource Sets (CORESETs) according to corresponding search space configurations (for NR/5G). A CORESET includes a set of PRBs with a time duration of 1 to 3 OFDM symbols. The REGs and control channel elements (CCEs) are defined within a CORESET with each CCE including a set of REGs. Interleaved and non-interleaved CCE-to-REG mapping are supported in a CORESET. Each REG carrying PDCCH carries its own DMRS. The ControlResourceSet information element (IE) in an RRC configuration message is used to configure a time/frequency CORESET in which to search for DCI (see e.g., TS 38.213).

PDSCH transmissions are scheduled by DCI format 1_0 and DCI format 1_1. DCI format 1_0 is used for the scheduling of PDSCH in one DL cell and DCI format 1_1 is used for the scheduling of PDSCH in one cell. DCI format 1_0 includes, inter alia, a frequency domain resource assignment, a time domain resource assignment, and other fields/elements as discussed in TS 38.212. DCI format 1_1 includes, inter alia, a bandwidth part indicator, a frequency domain resource assignment, a time domain resource assignment, antenna port(s) where the number of CDM groups without data of values 1, 2, and 3 refers to CDM groups {0}, {0,1}, and {0, 1,2} respectively and the antenna ports $\{p_0, \ldots, p_{v-1}\}$ are determined according to the ordering of DMRS port(s) given by Tables 7.3.1.2.2-1/2/3/4 of TS 38.212, and other fields/elements as discussed in TS 38.212.

The UE 101 can be configured with a list of up to M TCI-State configurations within the higher layer parameter PDSCH-Config to decode the PDSCH according to a detected PDCCH with DCI intended for the UE 101 and the given serving cell, where M depends on the UE capability maxNumberConfiguredTCIstatesPerCC. The PDSCH-Config information element (IE) is used to configure UE-specific PDSCH parameters including the tci-StatesToAddModList parameter, which includes a list of Transmission Configuration Indicator (TCI) states indicating a transmission configuration. Each TCI-State IE contains a tci-StateId used to identify a corresponding TCI-State configuration and parameters for configuring a QCL relationship between one or two DL reference signals and the DM-RS ports of the PDSCH, the DM-RS port of PDCCH, or the CSI-RS port(s) of a CSI-RS resource. The QCL relationship is configured by the higher layer parameter qcl-Type1 for the first DL RS, and qcl-Type2 for the second DL reference signal (RS), if configured. For the case of two DL RSs, the QCL types are not be the same, regardless of whether the references are to the same DL RS or different DL RSs. In addition to the qcl-Type1 and qcl-Type2 parameters, the TCI-State IE also contains a QCL-Info IE, which includes a bwp-Id parameter indicating the DL BWP which the RS is located in, a referenceSignal parameter indicating an RS with which QCL information is provided as specified in subclause 5.1.5 of TS 38.214, a cell parameter indicating the UE's 101 serving cell in which the referenceSignal is configured or the serving cell in which the TCI-State is configured if the referenceSignal field is absent, and a qcl-Type indicating the QCL type (enumerated with typeA, typeB, typeC, or typeD as discussed infra).

The QCL types corresponding to each DL RS are given by the higher layer parameter qcl-Type in QCL Info and may take one of the following values: 'QCL-TypeA' for QCL with respect to (w.r.t.) Doppler shift, Doppler spread, average delay, delay spread, 'QCL-TypeB' w.r.t. Doppler shift, Doppler spread, 'QCL-TypeC' w.r.t. Doppler shift, average delay, and 'QCL-TypeD' w.r.t. Spatial Rx parameter. If the TCI-State is configured with a reference to an RS with 'QCL-TypeD' association, that RS may be an SSB located in the same or different CC/DL BWP or a CSI-RS resource configured as periodic located in the same or different CC/DL BWP.

The UE receives an activation command (e.g., a MAC CE), as described infra and as described in subclause 6.1.3.14 of 3GPP TS 38.321 v15.3.0 (2018 September) (hereinafter "TS 38.321"), used to map up to 8 TCI states to the codepoints of the DCI field 'Transmission Configuration Indication'. If no RSs are provided for BFD, the UE 101 performs beam monitoring based on the activated TCI-State for PDCCH as described in clause 6 of TS 38.213.

The radio interface 103, 104 between the UEs 101 and the RAN 110 is governed by the Radio Resource Control (RRC) protocol. RRC provides functions including, inter alia, RRC connection control, measurement configuration and reporting, among others. RRC connection control includes, inter alia, paging procedures, radio configuration control, and RRC connection establishment, modification, suspension, resumption, and release. During RRC connection establishment, the network (NW) may configure the UE 101 to perform measurement reporting or other like functions. RRC includes various UE 101 operating states including RRC_CONNECTED, RRC_INACTIVE, and RRC_IDLE. The UE 101 is in RRC_IDLE when no RRC connection is established, and the UE 101 is in RRC_CONNECTED and RRC_INACTIVE when a connection is established. The UE 101 in RRC_CONNECTED transfers unicast data; monitors control channels associated with the shared data channel to determine if data is scheduled for the UE 101; provides channel quality and feedback information; performs neighbor cell measurements and measurement reporting; and acquires system information (SI).

The RRC connection control functions include, inter alia, radio link failure (RLF) functions, link recovery functions, beam failure detection (BFD) functions, and beam failure recovery (BFR) functions. RLM refers to mechanisms used by the UE 101 for monitoring the DL radio link quality (RLQ) of a primary cell (PCell) for the purpose of indicating out-of-sync/in-sync status to higher layers. The term "a "Primary Cell" or "PCell" refers to a master cell group (MCG) cell, operating on a primary frequency, in which the UE 101 either performs an initial connection establishment procedure or initiates a connection re-establishment procedure. The UE 101 is not required to monitor the DL RLQ in DL BWPs other than the active DL BWP on the PCell. If the active DL BWP is the initial DL BWP and for SSBs and CORESET multiplexing pattern 2 or 3, the UE 101 is expected to perform RLM using the associated SSB when the associated SSB index is provided by the parameter/IE RadioLinkMonitoringRS. The term "SSB" refers to both a synchronization signal block and a synchronization signal (SS)/PBCH block.

In RRC_CONNECTED, the UE 101 performs RLM in the active BWP based on reference signals (e.g., SSB, CSI-RS, etc.) and signal quality thresholds configured by the NW. SSB-based RLM is based on the SSB associated to the initial DL BWP and can only be configured for the initial DL BWP and for DL BWPs containing the SSB associated to the initial DL BWP. For other DL BWPs, RLM is performed based on CSI-RS. The UE 101 declares an RLF when one of the following criteria are met: expiration of a timer started after indication of radio problems from the physical layer (if radio problems are recovered before the timer is expired, the UE stops the timer); a random access (RA) procedure failure is detected; and/or upon detection of a RLC failure. After an RLF is declared, the UE 101 stays in RRC_CONNECTED; selects a suitable cell and initiates the RRC connection re-establishment procedure; and/or enters RRC_IDLE if a suitable cell was not found within a certain time after RLF was declared.

For detection of physical layer problems in RRC_CONNECTED, the UE 101 starts the timer T310 for a corresponding special cell (SpCell) upon receiving N310 consecutive "out-of-sync" indications for the SpCell from lower layers while neither timers T300, T301, T304, T311 nor T319 are running. Here, "N310" is a maximum number of consecutive "out-of-sync" indications for the SpCell received from lower layers, and may also refer to the value of a counter N310. For recovery of physical layer problems, upon receiving N311 consecutive "in-sync" indications for the SpCell from lower layers while timer T310 is running, the UE 101 stops the timer T310 for the corresponding SpCell. Here, "N311" is a maximum number of consecutive "in-of-sync" indications for the SpCell received from lower layers, and may also refer to the value of a counter N311. In this case, the UE 101 maintains the RRC connection without explicit signalling, and the UE 101 maintains the entire radio resource configuration. Periods in time where neither "in-sync" nor "out-of-sync" is reported by L1 do not affect the evaluation of the number of consecutive "in-sync" or "out-of-sync" indications.

For detection of RLFs, upon timer T310 expiry in a PCell; upon receipt of a random access problem indication from an MCG MAC layer instance while neither timers T300, T301, T304, T311 nor T319 are running; or upon receipt of an indication from an MCG RLC layer instance that the maximum number of retransmissions has been reached, and for the corresponding logical channel allowedServingCells only includes SCell(s), the UE 101 initiates the failure information procedure as specified in section 5.7.5 of 3GPP TS 38.331 v15.3.0 (2018 September) (hereinafter "TS 38.331") to report an RLC failure if the indication is from the MCG RLC layer instance and CA duplication is configured and activated. Otherwise, the UE 101 considers an RLF to be detected for the MCG; performs the actions upon going to RRC_IDLE as specified in section 5.3.11 of TS 38.331 with release cause 'other' if access stratum (AS) security has not been activated; performs the actions upon going to RRC_IDLE as specified in section 5.3.11 of TS 38.331 with release cause 'RRC connection failure' if AS security has been activated but SRB2 and at least one DRB have not been setup; or initiates the connection re-establishment procedure as specified in section 5.3.7 of TS 38.331.

Upon timer T310 expiration in a PSCell; upon receipt of a random access problem indication from an SCG MAC layer instance; or upon receipt of an indication from an SCG RLC layer instance that the maximum number of retransmissions has been reached, and for the corresponding logical channel allowedServingCells only includes SCell(s), the UE 101 initiates the failure information procedure as specified in section 5.7.5 of 38.331 to report an RLC failure if the indication is from the SCG RLC layer instance and CA duplication is configured and activated; considers an RLF to be detected for the SCG; and initiates the SCG failure information procedure as specified in section 5.7.3 of 38.331 to report SCG RLF.

For performing Link Recovery Procedures (LRPs), The UE 101 assess the DL RLQ of a serving cell based on the reference signal in the set $\bar{q}_0$, as specified in 3GPP TS 38.213 v15.3.0 (2018 October) (hereinafter "TS 38.213") in order to perform BFD for one or more beams. The RS resource configurations in the set $\bar{q}_0$ can be periodic CSI-RS resources and/or SSBs. The UE 101 can be provided, for each BWP of a serving cell, a set $\bar{q}_0$ of periodic CSI-RS resource configuration indexes by failureDetectionResources and a set $\bar{q}_1$ of periodic CSI-RS resource configuration indexes and/or SSB indexes by candidateBeamRSList for RLQ measurements on the BWP of the serving cell. If the UE 101 is not provided with failureDetectionResources, the UE 101 determines the set $\bar{q}_0$ to include periodic CSI-RS resource configuration indexes with the same values as the RS indexes in the RS sets indicated by a TCI-State for respective CORESETs that the UE 101 uses for monitoring the PDCCH and, if there are two RS indexes in a TCI state, the set $\bar{q}_0$, includes RS indexes with QCL-TypeD configuration for the corresponding TCI states. The UE 101 expects the set $\bar{q}_0$ to include up to two RS indexes. The UE 101 expects single port RS in the set $\bar{q}_0$.

The UE 101 is not required to perform BFD outside the active DL BWP, and the UE 101 is not required to perform Candidate Beam Detection (CBD) outside the active DL BWP. CBD for SSB based beams is discussed in clause 8.5.5 of 3GPP TS 38.133 v15.3.0 (2018 October) (hereinafter "TS 38.133"), and CBD for CSI-RS based beams is discussed in clause 8.5.6 of TS 38.133. The UE 101 is not required to meet the requirements in clauses 8.5.2 and 8.5.3 of TS 38.133 if the UE 101 does not have set $\bar{q}_0$.

The thresholds $Q_{out\_LR}$ and $Q_{in,LR}$ correspond to the default value of rlmInSyncOutOfSyncThreshold, as described in 3GPP TS 38.133 for $Q_{out}$, and to the value provided by rsrp-ThresholdSSB, respectively.

On each RS resource configuration in the set $\bar{q}_0$, the UE 101 estimates the RLQ and compares it to the threshold $Q_{out\_LR}$ for the purpose of accessing DL RLQ of the serving cell beams. The threshold $Q_{out\_LR}$ is defined as the level at which the DL radio level link of a given resource configuration on set $\bar{q}_0$ be reliably received and shall correspond to the $BLER_{out}$=10% block error rate of a hypothetical PDCCH transmission. For SSB based BFD, $Q_{out\_LR\_SSB}$ is derived based on the hypothetical PDCCH transmission parameters listed in Table 8.5.2.1-1 in TS 38.133. For CSI-RS based BFD, $Q_{out\_LR\_CSI-RS}$ is derived based on the hypothetical PDCCH transmission parameters listed in Table 8.5.3.1-1 in TS 38.133.

The physical layer (PHY) in the UE 101 assesses the RLQ according to the set $\bar{q}_0$ of resource configurations against the threshold $Q_{out,LR}$. For the set $\bar{q}_0$, the UE 101 assesses the RLQ only according to periodic CSI-RS resource configurations or SSBs that are QCLed with the DM-RS of PDCCH receptions monitored by the UE 101, as described in 3GPP TS 38.214 v15.3.0 (2018 October) (hereinafter "TS 38.214"). The UE 101 applies the $Q_{in,LR}$ threshold to the L1-RSRP measurement obtained from a SS/PBCH block. The UE 101 applies the $Q_{in,LR}$ threshold to the L1-RSRP measurement obtained for a CSI-RS resource after scaling a respective CSI-RS reception power with a value provided by powerControlOffsetSS.

In non-Discontinuous Reception (DRX) mode operation, the PHY in the UE 101 provides an indication to higher layers when the RLQ for all corresponding resource configurations in the set $\bar{q}_0$ that the UE 101 uses to assess the RLQ is worse than the threshold $Q_{out,LR}$. The physical layer informs the higher layers when the RLQ is worse than the threshold $Q_{out,LR}$ with a periodicity determined by the maximum between the shortest periodicity among the periodic CSI-RS configurations and/or SSBs in the set $\bar{q}_0$ that the UE 101 uses to assess the RLQ and 2 milliseconds (ms). In DRX mode operation, the physical layer provides an indication to higher layers when the RLQ is worse than the threshold $Q_{out,LR}$ with a periodicity determined as described in TS 38.133.

Upon request from higher layers, the UE 101 provides, to higher layers, the periodic CSI-RS configuration indexes and/or SSB indexes from the set $\bar{q}_1$ and the corresponding L1-RSRP measurements that are larger than or equal to the $Q_{in,LR}$ threshold. The UE 101 delivers configuration indexes from the set $\bar{q}_1$ as specified in TS 38.213 to higher layers, and the corresponding L1-RSRP measurement provided that the measured L1-RSRP is equal to or better than the threshold $Q_{in\_LR}$, which is indicated by higher layer parameter rsrp-ThresholdSSB. The UE 101 applies the $Q_{in\_LR}$ threshold to the L1-RSRP measurement obtained from an SSB. The UE 101 applies the $Q_{in\_LR}$ threshold to the L1-RSRP measurement obtained for a CSI-RS resource after scaling a respective CSI-RS reception power with a value provided by the higher layer parameter powerControlOffsetSS. The RS resource configurations in the set $\bar{q}_1$ can be periodic CSI-RS resources, SSBs, or both SSB and CSI-RS resources.

A UE 101 can be provided a CORESET through a link to a search space set provided by recoverySearchSpaceId, as described in subclause 10.1 of TS 38.213 for monitoring PDCCH in the CORESET. If the UE 101 is provided recoverySearchSpaceId, the UE 101 does not expect to be provided another search space set for monitoring PDCCH in the CORESET associated with the search space set provided by recoverySearchSpaceId.

The UE 101 may receive by PRACH-ResourceDedicatedBFR, a configuration for PRACH transmission as described in subclause 8.1 of TS 38.213. For PRACH transmission in slot n and according to antenna port QCL parameters associated with periodic CSI-RS resource configuration or with SS/PBCH block associated with index $q_{new}$ provided by higher layers (see e.g., TS 38.321), the UE 101 monitors PDCCH in a search space set provided by recoverySearchSpaceId for detection of a DCI format with CRC scrambled by Cell Radio Network Temporary Identifier (C-RNTI) or Modulation and Coding Scheme (MCS)-C-RNTI starting from slot n+4 within a window configured by BeamFailureRecoveryConfig. For PDCCH monitoring in a search space set provided by recoverySearchSpaceId and for corresponding PDSCH reception, the UE 101 assumes the same antenna port quasi-collocation parameters as the ones associated with index $q_{new}$ until the UE 101 receives, by higher layers, an activation for a TCI state or any of the parameters tci-StatesPDCCH-ToAddList and/or tci-StatesPDCCH-ToReleaseList. After the UE 101 detects a DCI format with CRC scrambled by C-RNTI or MCS-C-RNTI in the search space set provided by recoverySearchSpaceId, the UE 101 continues to monitor PDCCH candidates in the search space set provided by recoverySearchSpaceId until the UE 101 receives a MAC CE activation command for a TCI state or tci-StatesPDCCH-ToAddList and/or tci-StatesPDCCH-ToReleaseList.

After 28 symbols from a last symbol of a first PDCCH reception in a search space set provided by recoverySearchSpaceId for which the UE 101 detects a DCI format with CRC scrambled by C-RNTI or MCS-C-RNTI and until the UE 101 receives an activation command for PUCCH-SpatialRelationInfo (see e.g., TS 38.321) or is provided PUCCH-SpatialRelationInfo for PUCCH resource(s), the UE 101 transmits a PUCCH on a same cell as the PRACH transmission using a same spatial filter as for the last PRACH transmission, and a power determined as described in subclause 7.2.1 of TS 38.213 with $q_u=0$, $q_d=q_{new}$, and $l=0$. After 28 symbols from a last symbol of a first PDCCH reception in a search space set provided by recoverySearchSpaceId where a UE 101 detects a DCI format with CRC scrambled by C-RNTI or MCS-C-RNTI, the UE 101 assumes same antenna port quasi-collocation parameters as the ones associated with index $q_{new}$ for PDCCH monitoring in a CORESET with index 0.

For BFD, the RAN node 111 (e.g., a gNB) configures the UE 101 with BFD reference signals (e.g., SSB, CSI-RS, etc.) and the UE 101 declares a beam failure when a number of beam failure instance indications from the physical layer (PHY) reaches a configured threshold before a configured timer expires. SSB-based BFD is based on the SSB associated to the initial DL BWP and can only be configured for the initial DL BWPs and for DL BWPs containing the SSB associated to the initial DL BWP. For other DL BWPs, BFD is performed based on CSI-RS.

After beam failure is detected, the UE 101 triggers a BFR procedure by initiating an RA procedure on the PCell; and selects a suitable beam to perform BFR (e.g., if the gNB 111 has provided dedicated RA resources for certain beams, those will be prioritized by the UE 101). Upon completion of the RA procedure, BFR is considered complete.

UEs 101 in RRC_INACTIVE and RRC_IDLE also perform neighbor cell measurements and cell (re-)selection, among other functions. Cell selection involves "camping on a cell" wherein the UE 101 searches for a suitable cell, selects the suitable cell to provide available services, and monitors for the control channel of the suitable cell. The cell selection process takes place as described in 3GPP TS 38.304 v15.1.0 (2018 October) (hereinafter "TS 38.304"). Cell reselection involves the UE 101 finding a more suitable cell according to cell reselection criteria, and reselecting and camping on the more suitable cell. When the UE 101 is in either Camped Normally state or Camped on Any Cell state on a cell, the UE 101 attempts to detect, synchronize, and monitor intra-frequency, inter-frequency, and inter-RAT cells indicated by the serving cell. UE 101 measurement activity is also controlled by measurement rules defined in TS 38.304, allowing the UE 101 to limit its measurement activity.

The RAN 110 is shown to be communicatively coupled to a core network (CN) 120 comprising one or more network elements 122, which are configured to offer various data and telecommunications services to customers/subscribers (e.g., users of UEs 101) who are connected to the CN 120 via the RAN 110. The term "network element" as used herein refers to physical or virtualized equipment and/or infrastructure used to provide wired or wireless communication network services, and may be considered synonymous with, and/or referred to as, a networked computer, networking hardware, network equipment, network node, router, switch, hub, bridge, radio network controller (RNC), RAN device, RAN node, gateway, server, cloud node, Virtualized Network Function (VNF), NFV Infrastructure (NFVI), and/or the like. The network elements 122 may be one or more server computer systems, which may implement various CN elements (e.g., network functions (NFs) and/or application functions (AFs)) such as those discussed herein. The components of the CN 120 may be implemented in one physical node or separate physical nodes including components to read and execute instructions from a machine-readable or computer-readable medium (e.g., a non-transitory machine-readable storage medium). In some embodiments, Network Function Virtualization (NFV) may be utilized to virtualize any or all network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. As used herein, the terms "instantiate," "instantiation," and the like refers to the creation of an instance, and an "instance" refers to a concrete occurrence of an object, which may occur, for example, during execution of program code. NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more NFs/AFs.

In embodiments where the CN 120 is an Evolved Packet Core (EPC) in LTE systems, the one or more network elements 122 may include or operate one or more Mobility Management Entities (MMEs), Serving Gateways (S-GWs), PDN Gateways (P-GWs), Home Subscriber Servers (HSSs), Policy Control and Charging Rules Functions (PCRFs), and/or other like LTE CN elements. In these embodiments, the E-UTRAN 110 may be connected with the EPC 120 via an S1 interface 113. In these embodiments, the S1 interface 113 is split into two parts: an S1-U interface 114 to carry traffic data between the RAN nodes 111 and the S-GW, and the S1-MME interface 115, which is a signaling interface between the RAN nodes 111 and MMEs. Additionally, the P-GW within the EPC 120 may route data packets between the EPC 120 and external networks such as a network including a Packet Data Network (PDN) 130 via an Internet Protocol (IP) interface 125. The PDN 130 may be an operator external public, a private PDN (e.g., enterprise network, cloud computing service, etc.), or an intra-operator PDN (e.g., for provision of IMS and/or IP-CAN services).

In embodiments where the CN 120 is a 5GC 120, the network elements 122 may implement one or more instances of an Authentication Server Function (AUSF), Access and Mobility Management Function (AMF), Session Management Function (SMF), Network Exposure Function (NEF), Policy Control Function (PCF), NF Repository Function (NRF), Unified Data Management (UDM) entity, AF, User Plane Function (UPF), Short Message Service Function (SMSF), Non-3GPP Interworking Function (N3IWF), Network Slice Selection Function (NSSF), and/or other like NR NFs. In such embodiments, the NG-RAN 110 may be connected with the 5GC 120 via an NG interface 113. In these embodiments, the NG interface 113 may be split into two parts, an NG-U interface 114, which carries traffic data between the RAN nodes 111 and a UPF, and the NG-C interface 115, which is a signaling interface between the RAN nodes 111 and AMFs. Additionally, the UPF within the 5GC 120 may perform packet routing, filtering, inspection, forwarding, etc., between the 5GC 120 and external networks such as a data network (DN) 130 via an IP interface 125. The DN 130 may represent one or more DNs including one or more Local Area DNs (LADNs), and may be an operator external public, a private PDN, an intra-operator PDN as discussed previously.

The CN 120 is shown to be communicatively coupled to PDN/DN 130 via an IP communications interface 125. The PDN/DN 130 may include one or more application servers (AS). The application server(s) (and the network element(s) 122) comprise one or more physical and/or virtualized systems for providing functionality (or services) to one or more clients (e.g., UEs 101) over a network. Such servers may include various computer devices with rack computing architecture component(s), tower computing architecture component(s), blade computing architecture component(s), and/or the like. The server(s) may represent a cluster of servers, a server farm, a cloud computing service, or other grouping or pool of servers, which may be located in one or more datacenters. The server(s) may also be connected to, or otherwise associated with one or more data storage devices (not shown). Generally, the AS(s) 130 offer applications or services that use IP/network resources. As examples, the server(s) may provide traffic management services, cloud computing services, content streaming services, immersive gaming experiences, social networking and/or microblogging services, one or more communication services (e.g., VoIP sessions, PTT sessions, group communication sessions, social networking services, etc.), and/or other like services for the UEs 101 via the CN 120.

As mentioned previously, the UE 101 may be configured to BFD and BFR procedures.

The requirements for SSB based BFD as shown by table 8.5.2.1-1 of TS 38.133 apply for each SSB resource in the set $\bar{q}_0$ configured for a serving cell, provided that the SSB configured for BFD is actually transmitted within the UE active DL BWP during the entire evaluation period specified in clause 8.5.2.2 of TS 38.133 and as discussed infra.

The UE 101 is able to evaluate whether the DL RLQ on the configured SSB resource in set $\bar{q}_0$ estimated over the last $T_{Evaluate\_BFD\_SSB}$ ms period becomes worse than the threshold $Q_{out\_LR\_SSB}$ within $T_{Evaluate\_BFD\_SSB}$ ms period. The value of $T_{Evaluate\_BFD\_SSB}$ is defined in Table 1 for FR1, and the value of $T_{Evaluate\_BFD\_SSB}$ is defined in Table 2 for FR2 with scaling factor N=8.

For FR1, $$P = \frac{1}{1 - \frac{T_{SSB}}{MRGP}},$$

when in the monitored cell there are measurement gaps configured for intra-frequency, inter-frequency or inter-RAT measurements, which are overlapping with some but not all occasions of the SSB; and P=1 when in the monitored cell there are no measurement gaps overlapping with any occasion of the SSB.

For FR2, $$P = \frac{1}{1 - \frac{T_{SSB}}{T_{SMTCperiod}}},$$

when BFD-RS is not overlapped with measurement gap and the BFD resource is partially overlapped with SMTC occasion ($T_{SSB}<T_{SMTCperiod}$); $P=P_{sharing\ factor}$, when the BFD resource is not overlapped with measurement gap and the BFD resource is fully overlapped with SMTC period ($T_{SSB}=T_{SMTCperiod}$);

$$P = \frac{1}{1 - \frac{T_{SSB}}{MRGP} - \frac{T_{SSB}}{T_{SMTCperiod}}},$$

when the BFD resource is partially overlapped with measurement gap and the BFD resource is partially overlapped with SMTC occasion ($T_{SSB}<T_{SMTCperiod}$) and SMTC occasion is not overlapped with measurement gap, and $T_{SMTCperiod} \neq MRGP$ or $T_{SMTCperiod}=MRGP$ and $T_{SSB}<0.5*T_{SMTCperiod}$;

$$P = \frac{P_{sharing\ factor}}{1 - \frac{T_{SSB}}{MRGP}},$$

when the BFD resource is partially overlapped with measurement gap and the BFD resource is partially overlapped with SMTC occasion ($T_{SSB}<T_{SMTCperiod}$) and SMTC occasion is not overlapped with measurement gap and $T_{SMTCperiod}=MRGP$ and $T_{SSB}=0.5*T_{SMTCperiod}$;

$$P = \frac{1}{1 - \frac{T_{SSB}}{\text{Min}(MRGP, T_{SMTCperiod})}},$$

when the BFD resource is partially overlapped with measurement gap ($T_{SSB}<MRGP$) and the BFD resource is partially overlapped with SMTC occasion ($T_{SSB}<T_{SMTCperiod}$) and SMTC occasion is partially or fully overlapped with measurement gap;

$$P = \frac{P_{sharing\ factor}}{1 - \frac{T_{SSB}}{MRGP}},$$

when the BFD resource is partially overlapped with measurement gap and the BFD resource is fully overlapped with SMTC occasion ($T_{SSB}=T_{SMTCperiod}$) and SMTC occasion is partially overlapped with measurement gap ($T_{SMTCperiod}$<MGRP); and $P_{sharing\ factor}=1$ if all of the reference signals configured for BFD outside measurement gap are not fully overlapped by intra-frequency SMTC occasions, or if all of the reference signal configured for BFD outside measurement gap and fully-overlapped by intra-frequency SMTC occasions are not overlapped by with the SSB symbols indicated by SSB-ToMeasure and 1 symbol before each consecutive SSB symbols indicated by SSB-ToMeasure and 1 symbol after each consecutive SSB symbols indicated by SSB-ToMeasure, given that SSB-ToMeasure is configured; $P_{sharing\ factor}=3$, otherwise. If the high layer signaling of smtc2 is configured (see e.g., TS 38.331), the $T_{SMTCperiod}$ corresponds to the value of higher layer parameter smtc2; Otherwise $T_{SMTCperiod}$ corresponds to the value of higher layer parameter smtc1. A Longer evaluation period may be expected if the combination of BFD resource, SMTC occasion, and measurement gap configurations does not meet pervious conditions.

TABLE 1

Evaluation period $T_{Evaluate\_BFD\_SSB}$ for FR1

| Configuration | $T_{Evaluate\_BFD\_SSB}$ (ms) |
|---|---|
| no DRX | Max([50], Ceil(5*P)*$T_{SSB}$) |
| DRX cycle ≤ 320 ms | Max([50], Ceil(7.5*P)*Max($T_{DRX}$, $T_{SSB}$)) |
| DRX cycle > 320 ms | Ceil(5*P)*$T_{DRX}$ |

Note:
$T_{SSB}$ is the periodicity of SSB in the set $\bar{q}_0$. $T_{DRX}$ is the DRX cycle length.

TABLE 2

Evaluation period $T_{Evaluate\_BFD\_SSB}$ for FR2

| Configuration | $T_{Evaluate\_BFD\_SSB}$ (ms) |
|---|---|
| no DRX | Max([50], Cceil(5*P*N)*$T_{SSB}$) |
| DRX cycle ≤ 320 ms | Mmax([50], Cceil(7.5*P*N)*Mmax($T_{DRX}$, $T_{SSB}$)) |
| DRX cycle > 320 ms | Cceil(5*P*N)*$T_{DRX}$ |

Note:
$T_{SSB}$ is the periodicity of SSB in the set $\bar{q}_0$. $T_{DRX}$ is the DRX cycle length.

Measurement restrictions for SSB based BFD, The UE 101 is required to be capable of measuring SSB for BFD without measurement gaps. The UE 101 is required to perform the SSB measurements with the following measurement restrictions.

For FR1, when the SSB for BFD measurement is in the same OFDM symbol as CSI-RS for RLM, BFD, CBD, or L1-RSRP measurement, if SSB and CSI-RS have same SCS, the UE 101 is able to measure the SSB for BFD measurement(s) without any restriction. If the SSB and CSI-RS have different SCS, and if the UE 101 supports simultaneousRxDataSSB-DiffNumerology, the UE 101 is able to measure the SSB for BFD measurement without any restriction. If the SSB and CSI-RS have different SCS, and if the UE 101 does not support simultaneousRxDataSSB-DiffNumerology, the UE 101 is required to measure one of, but not both, SSB for BFD measurement and CSI-RS. A longer measurement period for SSB based BFD measurement is expected, but no requirements are defined.

For FR2, when the SSB for BFD measurement is in the same OFDM symbol as CSI-RS for RLM, BFD, CBD, or L1-RSRP measurement, the UE 101 is required to measure one of, but not both, the SSB for BFD measurement and the CSI-RS. A longer measurement period for SSB based BFD measurement is expected, but no requirements are defined.

The requirements for CSI-RS based BFD as shown by table 8.5.3.1-1 of TS 38.133 apply for each CSI-RS resource in the set $\bar{q}_0$ of resource configurations for a serving cell, provided that the CSI-RS resource(s) in set $\bar{q}_0$ for BFD are actually transmitted within the UE active DL BWP during the entire evaluation period specified in clause 8.5.3.2 of TS 38.133 and discussed infra. The UE 101 is not expected to perform BFD measurements on the CSI-RS configured for BFD if the CSI-RS is not QCL-ed, with QCL-TypeD when applicable, with the RS in the active TCI state of any CORESET configured in the UE active BWP.

The UE 101 is able to evaluate whether the DL RLQ on the (configured) CSI-RS resource in set $\bar{q}_0$, estimated over the last $T_{Evaluate\_BFD\_CSI-RS}$ ms period becomes worse than the threshold $Q_{out\_LR\_CSI-RS}$ within $T_{Evaluate\_BFD\_CSI-RS}$ ms period. The value of $T_{Evaluate\_BFD\_CSI-RS}$ is defined in Table 3 for FR1, and the value of $T_{Evaluate\_BFD\_CSI-RS}$ is defined in Table 4 for FR2 with N=1. The requirements of $T_{Evaluate\_BFD\_CSI-RS}$ apply provided that the CSI-RS for BFD is not in a resource set configured with repetition ON. The requirements shall not apply when the CSI-RS resource in the active TCI state of CORESET is the same CSI-RS resource for BFD and the TCI state information of the CSI-RS resource is not given, wherein the TCI state information means QCL Type-D to SSB for L1-RSRP or CSI-RS with repetition ON.

For FR1, $$P = \frac{1}{1 - \frac{T_{CSI-RS}}{MRGP}},$$

when in the monitored cell there are measurement gaps configured for intra-frequency, inter-frequency or inter-RAT measurements, which are overlapping with some but not all occasions of the CSI-RS; and P=1 when in the monitored cell there are no measurement gaps overlapping with any occasion of the CSI-RS.

For FR2, P=1, when the BFD resource is not overlapped with measurement gap and also not overlapped with SMTC occasion;

$$P = \frac{1}{1 - \frac{T_{CSI-RS}}{MRGP}},$$

when the BFD resource is partially overlapped with measurement gap and the BFD resource is not overlapped with SMTC occasion ($T_{CSI-RS}$<MGRP);

$$P = \frac{1}{1 - \frac{T_{CSI-RS}}{T_{SMTCperiod}}},$$

when the BFD resource is not overlapped with measurement gap and the BFD resource is partially overlapped with SMTC occasion ($T_{CSI-RS}$<$T_{SMTCperiod}$); P=$P_{sharing\ factor}$, when the BFD resource is not overlapped with measurement gap and the BFD resource is fully overlapped with SMTC occasion ($T_{CSI-RS}=T_{SMTCperiod}$);

$$P = \frac{1}{1 - \frac{T_{CSI-RS}}{MRGP} - \frac{T_{CSI-RS}}{T_{SMTCperiod}}},$$

when the BFD resource is partially overlapped with measurement gap and the BFD resource is partially overlapped with SMTC occasion ($T_{CSI-RS}<T_{SMTCperiod}$) and SMTC occasion is not overlapped with measurement gap, and $T_{SMTCperiod} \neq MGRP$ or $T_{SMTCperiod}=MGRP$ and $T_{CSI-RS}<0.5*T_{SMTCperiod}$;

$$P = \frac{P_{sharing\ factor}}{1 - \frac{T_{CSI-RS}}{MRGP}},$$

when the BFD resource is partially overlapped with measurement gap and the BFD resource is partially overlapped with SMTC occasion ($T_{CSI-RS}<T_{SMTCperiod}$) and SMTC occasion is not overlapped with measurement gap and $T_{SMTCperiod}=MGRP$ and $T_{CSI-RS}=0.5*T_{SMTCperiod}$;

$$P = \frac{1}{1 - \frac{T_{CSI-RS}}{Min(MRGP,\ T_{SMTCperiod})}},$$

when the BFD resource is partially overlapped with measurement gap ($T_{CSI-RS}<MGRP$) and the BFD resource is partially overlapped with SMTC occasion ($T_{CSI-RS}<T_{SMTCperiod}$) and SMTC occasion is partially or fully overlapped with measurement gap;

$$P = \frac{P_{sharing\ factor}}{1 - \frac{T_{CSI-RS}}{MRGP}},$$

when the BFD resource is partially overlapped with measurement gap and the BFD resource is fully overlapped with SMTC occasion ($T_{CSI-RS}=T_{SMTCperiod}$) and SMTC occasion is partially overlapped with measurement gap ($T_{SMTCperiod}<MGRP$); and $P_{sharing\ factor}=3$.

If the high layer signaling of smtc2 is configured (see e.g., TS 38.331), the $T_{SMTCperiod}$ corresponds to the value of higher layer parameter smtc2; otherwise $T_{SMTCperiod}$ corresponds to the value of higher layer parameter smtc1. The overlap between CSI-RS for BFD and SMTC means that CSI-RS for BFD is within the SMTC window duration. A longer evaluation period may be expected if the combination of the BFD resource, SMTC occasion and measurement gap configurations does not meet pervious conditions. The values of $M_{BFD}$ used in Table 3 and Table 4 are defined as $M_{BFD}=10$, if the CSI-RS resource(s) in set $\bar{q}_0$ used for BFD is transmitted with Density=3.

TABLE 3

Evaluation period $T_{Evaluate\_BFD\_CSI-RS}$ for FR1

| Configuration | $T_{Evaluate\_BFD\_CSI-RS}$ (ms) |
|---|---|
| no DRX | Max([50], [$M_{BFD}$ *P] * $T_{CSI-RS}$) |
| DRX cycle ≤ 320 ms | Max([50], [1.5 × $M_{BFD}$ *P]*Max($T_{DRX}$, $T_{CSI-RS}$)) |
| DRX cycle > 320 ms | [$M_{BFD}$*P] * $T_{DRX}$ |

Note:
$T_{CSI-RS}$ is the periodicity of CSI-RS resource in the set $\bar{q}_0$. $T_{DRX}$ is the DRX cycle length.

TABLE 4

Evaluation period $T_{Evaluate\_BFD\_CSI-RS}$ for FR2

| Configuration | $T_{Evaluate\_BFD\_CSI-RS}$ (ms) |
|---|---|
| no DRX | Max([50], [$M_{BFD}$ *P*N] * $T_{CSI-RS}$) |
| DRX cycle ≤ 320 ms | Max([50], [1.5 × $M_{BFD}$*P*N]*Max($T_{DRX}$, $T_{CSI-RS}$)) |
| DRX cycle > 320 ms | [$M_{BFD}$ *P*N] * $T_{DRX}$ |

Note:
$T_{CSI-RS}$ is the periodicity of CSI-RS resource in the set $\bar{q}_0$. $T_{DRX}$ is the DRX cycle length.

Measurement restrictions for CSI-RS BFD, The UE 101 is required to be capable of measuring CSI-RS for BFD without measurement gaps. The UE 101 is required to perform the CSI-RS measurements with the following measurement restrictions.

For both FR1 and FR2, when the CSI-RS for BFD measurement is in the same OFDM symbol as the SSB for RLM, BFD, CBD, or L1-RSRP measurement, the UE 101 is not required to receive CSI-RS for BFD measurement in the PRBs that overlap with an SSB.

For FR1, when the SSB for RLM, BFD, CBD, or L1-RSRP measurement is within the active BWP and has a same SCS as the CSI-RS for BFD measurement, the UE 101 is able to perform CSI-RS measurement without restrictions. For FR1, when the SSB for RLM, BFD, CBD, or L1-RSRP measurement is within the active BWP and has a different SCS than the CSI-RS for BFD measurement, the UE 101 is able to perform CSI-RS measurement with restrictions according to its capabilities. If the UE 101 supports simultaneousRxDataSSB-DiffNumerology the UE 101 is able to perform CSI-RS measurement without restrictions. If the UE 101 does not support simultaneousRxDataSSB-DiffNumerology, the UE 101 is required to measure one of, but not both, the CSI-RS for BFD measurement and SSB. A longer measurement period for CSI-RS based BFD measurement is expected, but no requirements are defined. For FR1, when the CSI-RS for BFD measurement is in the same OFDM symbol as another CSI-RS for RLM, BFD, CBD, or L1-RSRP measurement, the UE 101 is able to measure the CSI-RS for BFD measurement without any restriction.

For FR2, when the CSI-RS for BFD measurement is in the same OFDM symbol as SSB for RLM, BFD, or L1-RSRP measurement, or in the same symbol as SSB for CBD when beam failure is detected, the UE 101 is required to measure one of, but not both, the CSI-RS for BFD measurement and SSB. A longer measurement period for CSI-RS based BFD measurement is expected, but no requirements are defined. For FR2, when the CSI-RS for BFD measurement is in the same OFDM symbol as another CSI-RS for RLM, BFD, CBD, or L1-RSRP measurement, in the following cases, the UE 101 is required to measure one of, but not both, the CSI-RS for BFD measurement and the other CSI-RS: the CSI-RS for BFD measurement or the other CSI-RS in a resource set configured with repetition ON, the other CSI-RS is configured in set $\bar{q}_1$ and beam failure is detected, or the two CSI-RS-es are not QCL-ed w.r.t. QCL-TypeD, or the QCL information is not known to UE; otherwise, UE 101 is able to measure the CSI-RS for BFD measurement without any restriction. For each of these cases, a longer measurement period for CSI-RS based BFD measurement is expected, but no requirements are defined.

Embodiments herein provide enhancements for SSB based BFD including QCL and use case restrictions for SSB for BFD and PDCCH, transition period handling for MAC CE based TCI indication and RRC reconfiguration of SSB based BFD, and mechanisms for implicit configuration of SSB for BFD.

For the QCL and use case restrictions for SSB for BFD and PDCCH, in a first embodiment, since CORESETs other than CORESET 0 are QCLed with a CSI-RS, which is defined in a Transmission Configuration Indicator (TCI) state, the SSB for BFD can only be configured in a BWP where CORESET 0 is configured. For CORESET 0, the UE 101 and the RAN node 111 (e.g., gNB) should maintain the same understanding of the SSB index. In a second embodiment, the UE 101 shall expect the SSB to be QCLed with the CSI-RS configured in a TCI state of a CORESET. In this embodiment, the SSB should be QCLed with the CSI-RS, which is QCLed with PDCCH in QCL-typeD if two RSs are configured in a TCI state.

Figure 2:
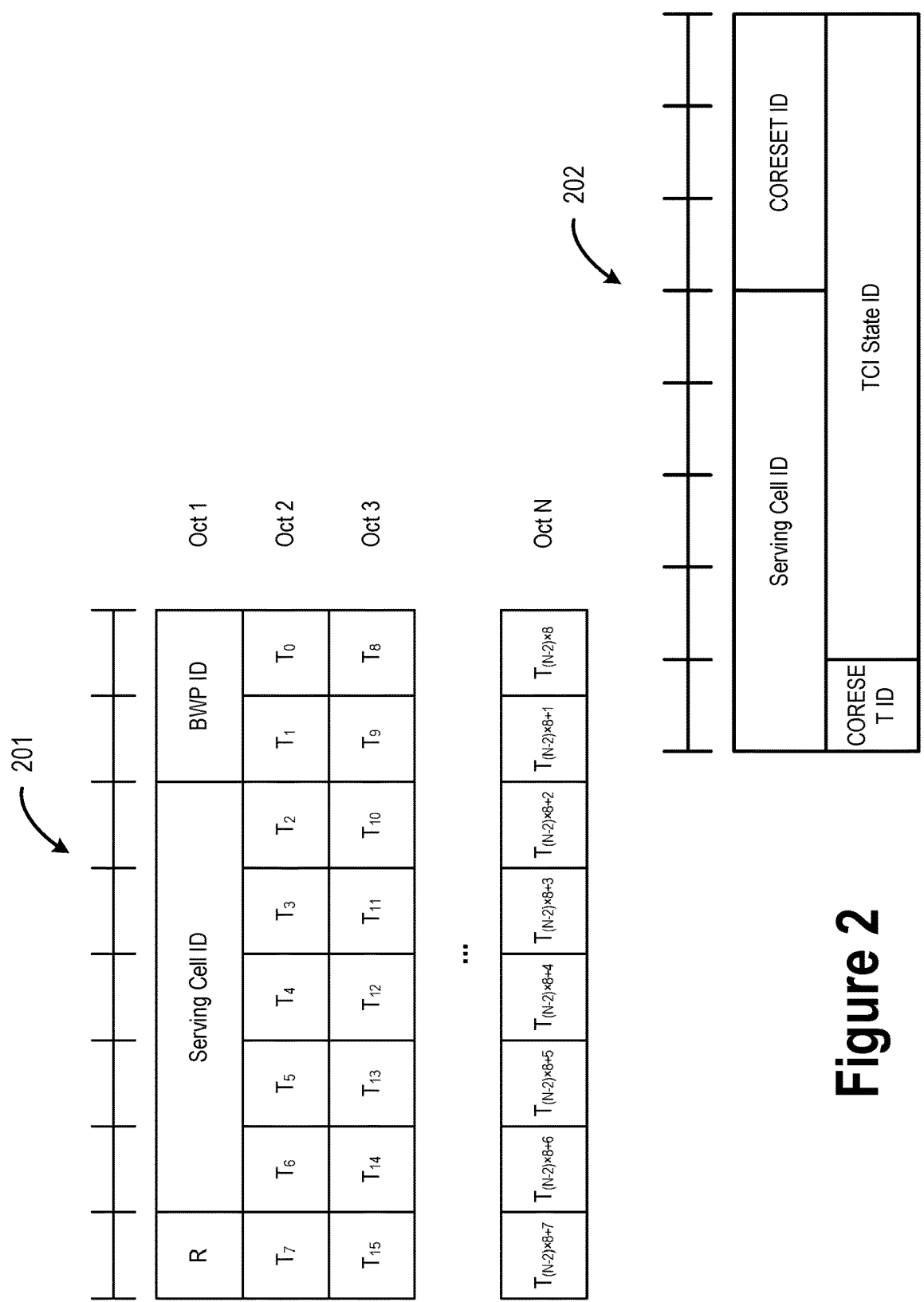
FIG. 2 shows example media access control (MAC) control elements (CEs) according to some embodiments.

In one example for either of the aforementioned embodiments, the network (e.g., RAN node 111) may select among configured aperiodic CSI trigger states of a Serving Cell by sending an Aperiodic CSI Trigger State Subselection MAC CE 201, as is shown by FIG. 2. The MAC CE 201 in FIG. 2 may also represent a TCI States Activation/Deactivation for UE-specific PDSCH MAC CE (discussed infra). The Aperiodic CSI Trigger State Subselection MAC CE is identified by a MAC subheader with LCID as specified in Table 6.2.1-1 of TS 38.321, and has variable size fields including a Serving Cell ID field (5 bits), a BWP ID field (2 bits), one or more $T_i$ field (each being 1 bit); and a reserved bit set to 0. The Serving Cell ID field indicates the identity of the Serving Cell for which the MAC CE applies. The BWP ID field indicates a DL BWP for which the MAC CE applies as the codepoint of the DCI bandwidth part indicator field as specified in TS 38.212. Each of the $T_i$ bits/fields indicates the selection status of the Aperiodic Trigger States configured within CSI-aperiodicTriggerStateList, as specified in TS 38.331. $T_0$ refers to the first trigger state within the list, $T_1$ to the second one and so on. If the list does not contain an entry with index i, the MAC entity in the UE 101 ignores the $T_i$ field. The $T_i$ field is set to 1 to indicate that the Aperiodic Trigger State i is to be mapped to the codepoint of the DCI CSI request field, as specified in TS 38.214. The codepoint to which the Aperiodic Trigger State is mapped is determined by its ordinal position among all the Aperiodic Trigger States with $T_i$ field set to 1, for example, the first Aperiodic Trigger State with $T_i$ field set to 1 to be mapped to the codepoint value 1, second Aperiodic Trigger State with $T_i$ field set to 1 to be mapped to the codepoint value 2 and so on. The maximum number of mapped Aperiodic Trigger States is 63. When the MAC entity in the UE 101 receives an Aperiodic CSI trigger State Subselection MAC CE 201 on a Serving Cell, the MAC entity in the UE 101 indicates, to lower layers, the information regarding Aperiodic CSI trigger State Subselection MAC CE 201.

In another example, the network (e.g., RAN node 111) may activate and deactivate the configured TCI states for PDSCH of a Serving Cell by sending the TCI States Activation/Deactivation for UE-specific PDSCH MAC CE 201. The configured TCI states for PDSCH are initially deactivated upon configuration and after a handover. The TCI States Activation/Deactivation for UE-specific PDSCH MAC CE 201 is identified by a MAC subheader with LCID as specified in Table 6.2.1-1 of TS 38.321, and has variable size fields including a Serving Cell ID field (5 bits), a BWP ID field (2 bits), one or more $T_i$ field (each being 1 bit); and a reserved bit set to 0. The Serving Cell ID field indicates the identity of the Serving Cell for which the MAC CE applies. The BWP ID field indicates a DL BWP for which the MAC CE applies as the codepoint of the DCI bandwidth part indicator field as specified in TS 38.212. Each of the $T_i$ bits/fields indicates the activation/deactivation status of the TCI state with TCI-StateId if there is a TCI state with TCI-StateId i as specified in TS 38.331; otherwise MAC entity in the UE 101 ignores the $T_i$ field. The $T_i$ field is set to 1 to indicate that the TCI state with TCI-StateId i is to be activated and mapped to the codepoint of the DCI Transmission Configuration Indication field, as specified in TS 38.214. The $T_i$ field is set to 0 to indicate that the TCI state with TCI-StateId i to be deactivated and is not mapped to the codepoint of the DCI Transmission Configuration Indication field. The codepoint to which the TCI State is mapped is determined by its ordinal position among all the TCI States with $T_i$ field set to 1, for example, the first TCI State with $T_i$ field set to 1 to be mapped to the codepoint value 0, second TCI State with $T_i$ field set to 1 is to be mapped to the codepoint value 1 and so on. The maximum number of activated TCI states is 8.

In another example, the network (e.g., RAN node 111) may indicate a TCI state for PDCCH reception for a CORESET of a Serving Cell by sending the TCI State Indication for UE-specific PDCCH MAC CE 202 as shown by FIG. 2. The TCI State Indication for UE-specific PDCCH MAC CE 202 is identified by a MAC subheader with LCID as specified in Table 6.2.1-1 of TS 38.321. The TCI State Indication for UE-specific PDCCH MAC CE 202 has a fixed size of 16 bits with a Serving Cell ID field (5 bits), a CORESET ID field (4 bits), and a TCI State ID field (7 bits). The Serving Cell ID field indicates the identity of the Serving Cell for which the MAC CE applies. The CORESET ID field indicates a Control Resource Set identified with ControlResourceSetId as specified in TS 38.331, for which the TCI State is being indicated. In case the value of the field is 0, the field refers to the Control Resource Set configured by controlResourceSetZero as specified in TS 38.331. The TCI State ID field indicates the TCI state identified by TCI-StateId as specified in TS 38.331 applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. When the MAC entity in the UE 101 receives a TCI State Indication for UE-specific PDCCH MAC CE 202 on a Serving Cell, the MAC entity in the UE 101 indicates, to lower layers, the information regarding the TCI State Indication for UE-specific PDCCH MAC CE 202.

For handling the transition delay mismatch for MAC CE based TCI indication and RRC reconfiguration of the SSB for BFD, in a first embodiment, the SSB for BFD is configured or activated by an MAC CE. In this embodiment, the MAC CE may include a component carrier (CC) index, one or more SSB indexes, and/or other like information. The maximum number of SSB indexes may be the same as the maximum number of configured CORESETs, the maximum number of SSB indexes may be equal to number of configured CORESETs in the active BWP. These embodiments can be applied to CSI-RS based BFD, where the SSB index(es) are CSI-RS resource index(es) to support MAC CE based CSI-RS for BFD configuration.

Figure 3:
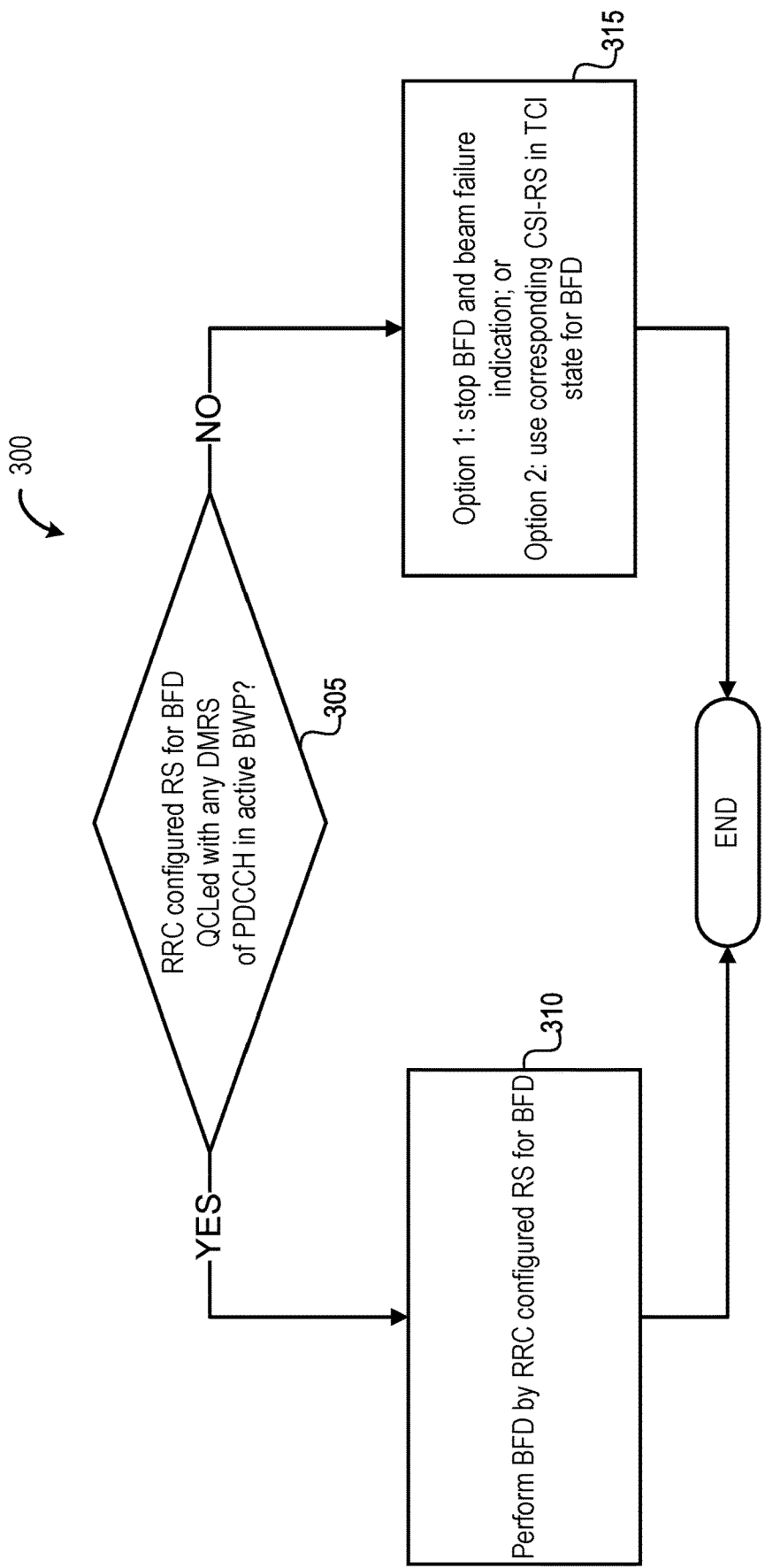
FIGS. 3 and 5 depicts an example processes for practicing the various embodiments discussed herein.

In a second embodiment for handling the transition delay mismatch, when the explicitly configured RS(s) (e.g., SSB and/or CSI-RS) is not QCLed with DMRS of PDCCH in the active BWP in the serving cell, the UE 101 shall stop beam failure detection and shall not indicate a beam failure indication; otherwise, the UE 101 performs BFD using the RRC configured RS for BFD. Alternatively, the UE 101 shall use a corresponding CSI-RS indicated in the TCI state of the DMRS of PDCCH for BFD when the explicitly configured RS(s) (e.g., SSB and/or CSI-RS) is not QCLed with DMRS of PDCCH in the active BWP in the serving cell. FIG. 3 illustrates an example procedure 300 for RS selection for BFD, according to this embodiment. Procedure 300 begins at operation 305 where the UE 101 determines whether an RRC configured RS for BFD is not QCLed with any DMRS for PDCCH in an active BWP. If the UE 101 determines that the RRC configured RS for BFD is QCLed with a DMRS for PDCCH in an active BWP, then the UE 101 proceeds to operation 310 to perform BFD using the RRC configured RS for BFD. If the UE 101 determines that the RRC configured RS for BFD is not QCLed with a DMRS for PDCCH in an active BWP, then the UE 101 proceeds to operation 315 to stop performing BFD and does not send a beam failure indicator, or the UE 101 performs BFD using a corresponding CSI-RS in a configured TCI state.

Figure 4:
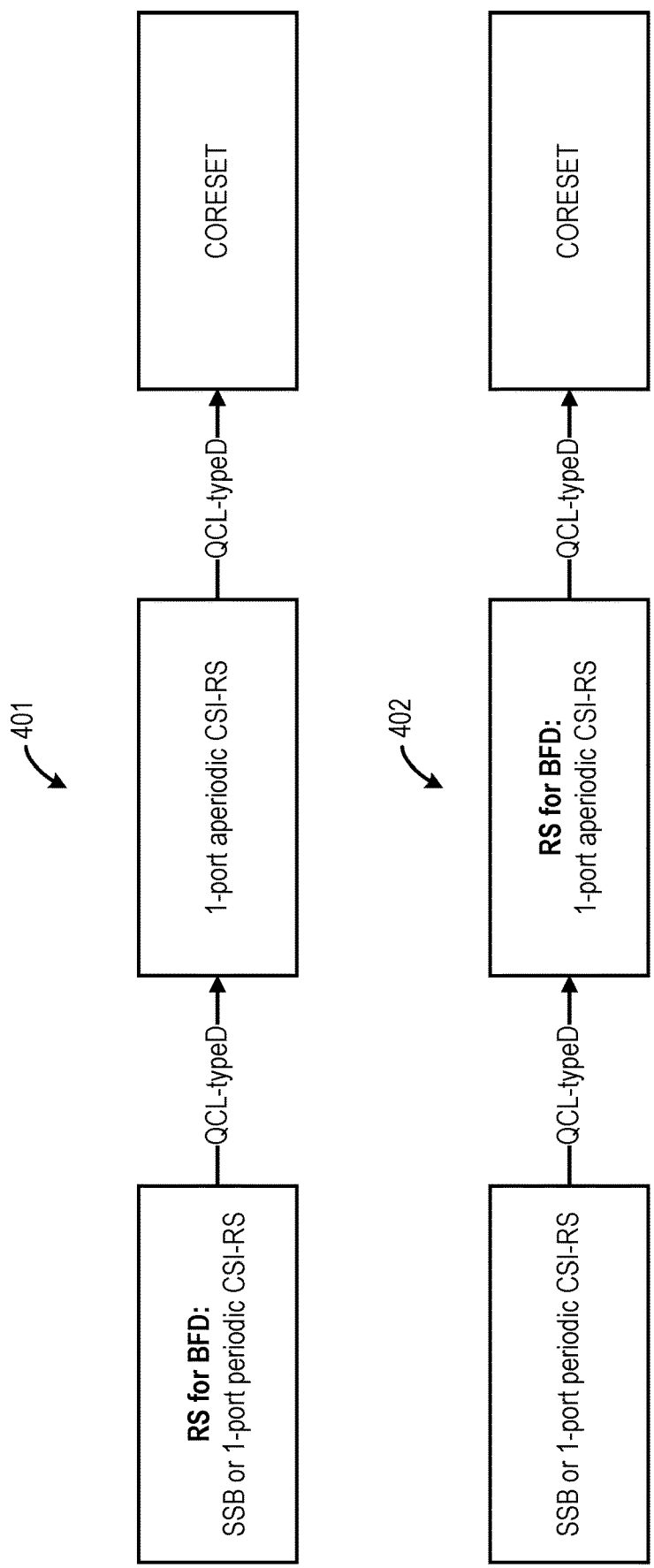
FIG. 4 shows example quasi co-location chains according to various embodiments.

For the implicit configuration of SSB based BFD, in an embodiment, if the UE 101 is not configured with any SSB or CSI-RS for BFD by higher layer signaling, the UE 101 shall use the CSI-RS configured in the TCI state for a CORESET if the CSI-RS is a 1-port periodic CSI-RS; otherwise, the UE 101 shall use the SSB or 1-port periodic CSI-RS QCLed with the CSI-RS configured in the TCI state for CORESET. In this embodiment, the QCL for SSB, CSI-RS, and/or DMRS of PDCCH should be QCLed with QCL-typeD if there are two RSs indicated in the TCI state for CORESET. Additionally or alternatively, the UE 101 shall expect the CSI-RS configured in the TCI state for CORESET, which is not a 1-port periodic CSI-RS, to be QCLed with either a periodic CSI-RS or an SSB. FIG. 4 illustrates example QCL chains for RS for BFD selection when no explicit RS for BFD is configured, according to various embodiments. In a first QCL chain 401, an RS for BFD is an SSB or a 1-port periodic CSI-RS, which is QCLed with the 1-port aperiodic CSI-RS, and the 1-port aperiodic CSI-RS is QCLed with the CORESET. In this case, the UE 101 can pick the SSB for BFD or pick the 1-port aperiodic CSI-RS configured in the TCI state for BFD. In the second QCL chain, the RS for BFD is the 1-port periodic CSI-RS, which is QCLed with the CORESET. In this case, the UE 101 uses the particular 1-port aperiodic CSI-RS configured in the TCI state for BFD.

Figure 5:
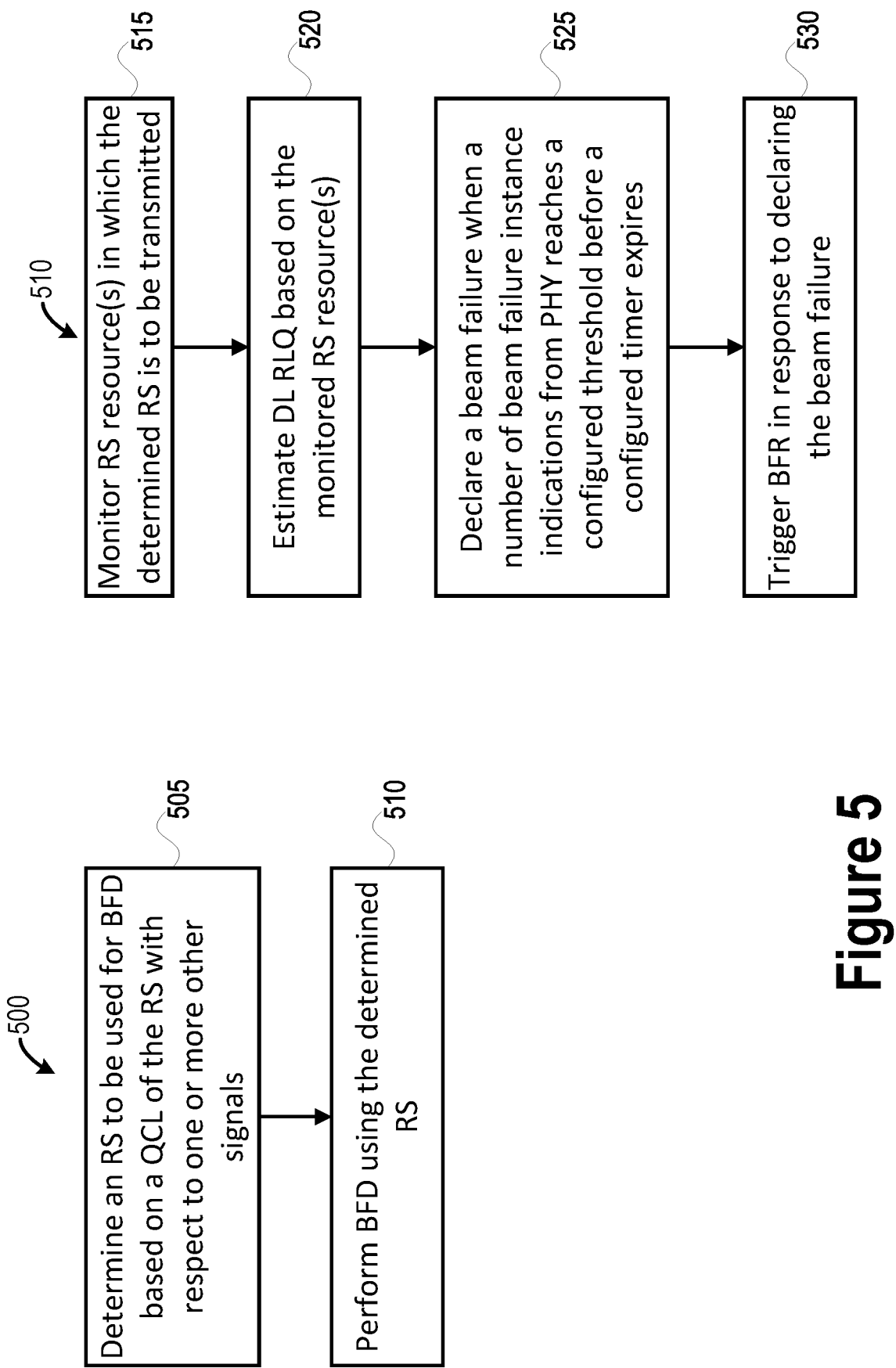

FIG. 5 shows an example BFD process 500, in accordance with various embodiments. For illustrative purposes, the various operations of process 500 are described as being performed by a UE 101 or elements thereof. In some embodiments, the process 500 may be embodied as one or more computer readable storage media comprising program code, instructions, or other like a computer program product (or data to create the computer program product), which is to cause a computing device (e.g., UE 101) to perform electronic operations and/or to perform the specific sequence or flow of actions described with respect to FIG. 5. While particular examples and orders of operations are illustrated by FIG. 5, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FBFD process 500 begins at operation 505 where the UE 101 (or baseband circuitry of the UE 101) determines an RS to be used for BFD based on a QCL of the RS with respect to another signal. The other signal may be another RS in some embodiments. At operation 510, the UE 101 (or baseband circuitry of the UE 101) performs the BFD procedure using the determined RS. After operation 510, process 500 may end or repeat as necessary FIG. 5 also shows operations 515-530 for performing the BFD at operation 510 in process 500. At operation 515, the UE 101 (or baseband circuitry of the UE 101) monitors determined RS resource(s) in which the RS is to be transmitted. At operation 520, the UE 101 (or baseband circuitry of the UE 101) estimates a DL RLQ based on the monitored RS resource(s). At operation 525, declares a beam failure when a number of beam failure instance indications from a PHY entity operated by the baseband circuitry of the UE 101 reaches a configured threshold before a configured timer expires. In this example, the number of beam failure instance indications are based on the estimated DL radio link quality. At operation 530, the UE 101 (or baseband circuitry of the UE 101) triggers a BFR procedure in response to declaration of the beam failure. After operation 530, process 510 returns back to process 500.

Example Systems and Implementations

Figure 7:
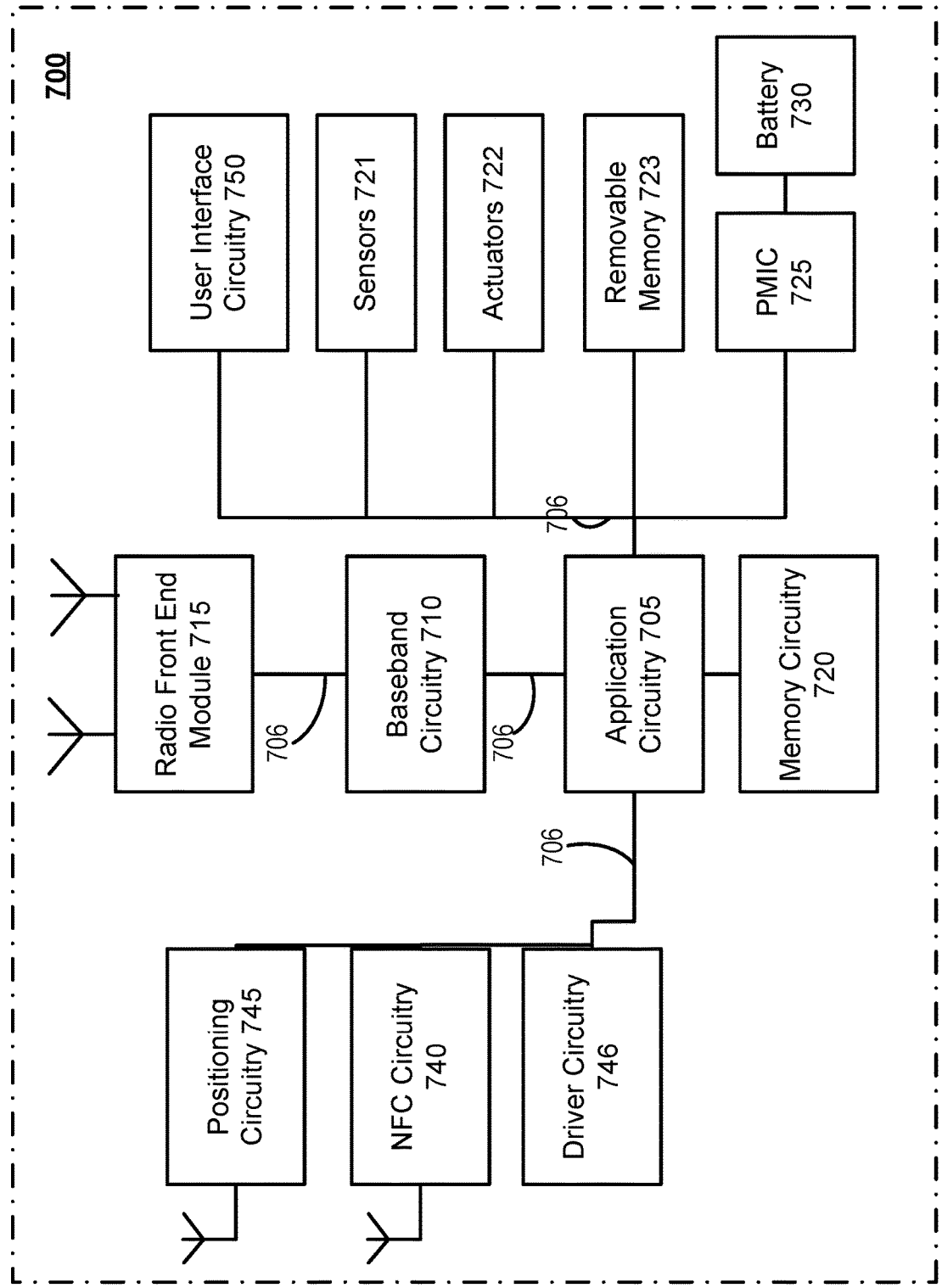
FIG. 7 illustrates an example of a platform in accordance with various embodiments.
Figure 8:
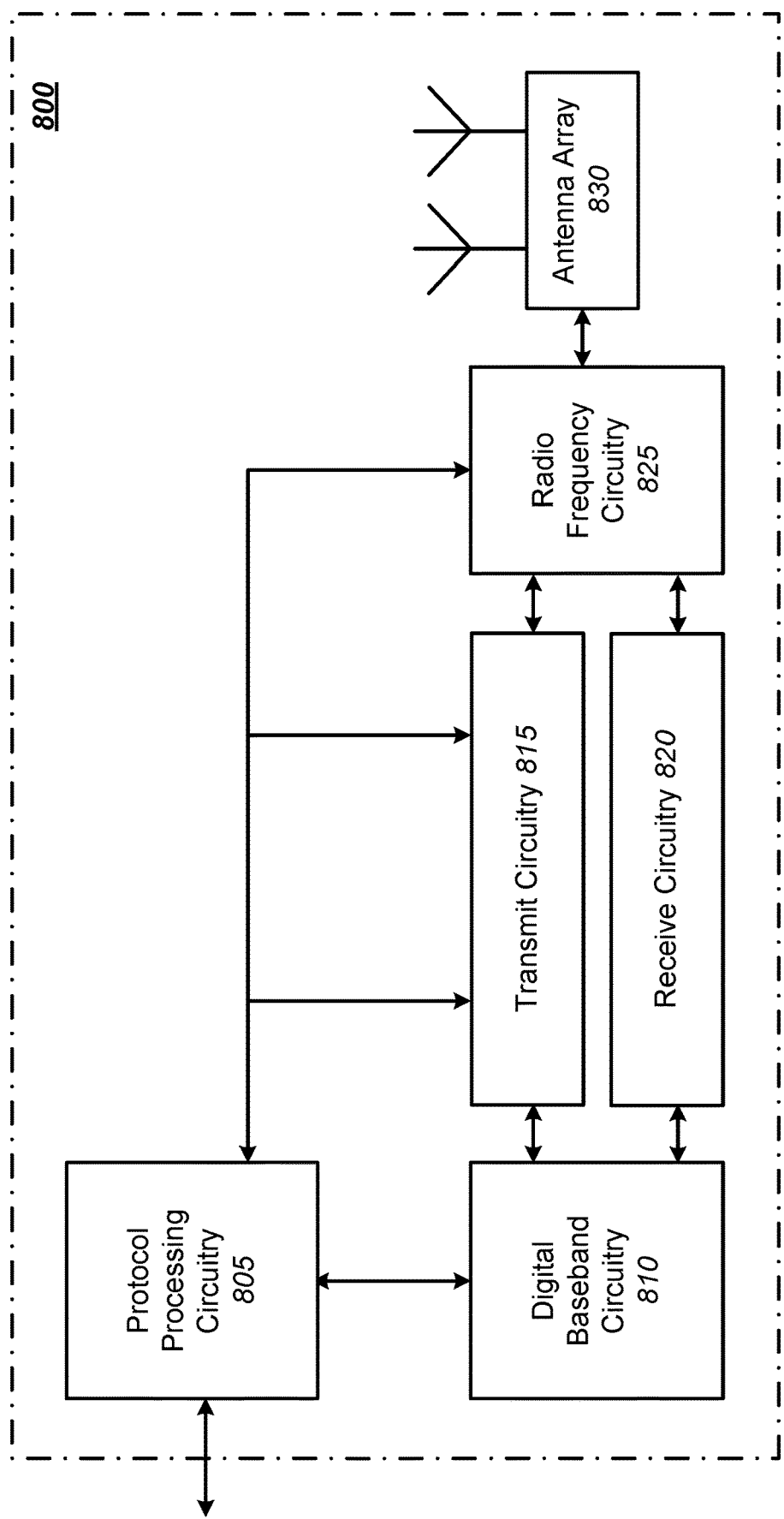
FIG. 8 illustrates an example of communication circuitry that may be used to practice the embodiments discussed herein.

Each of the UEs 101, RAN nodes 111, AP 106, network element(s) 122, application servers 130, and/or any other device or system discussed previously with respect to FIGS. 1-7 may include various hardware and/or software elements, such as those discussed infra with respect to FIGS. 6-8.

Figure 6:
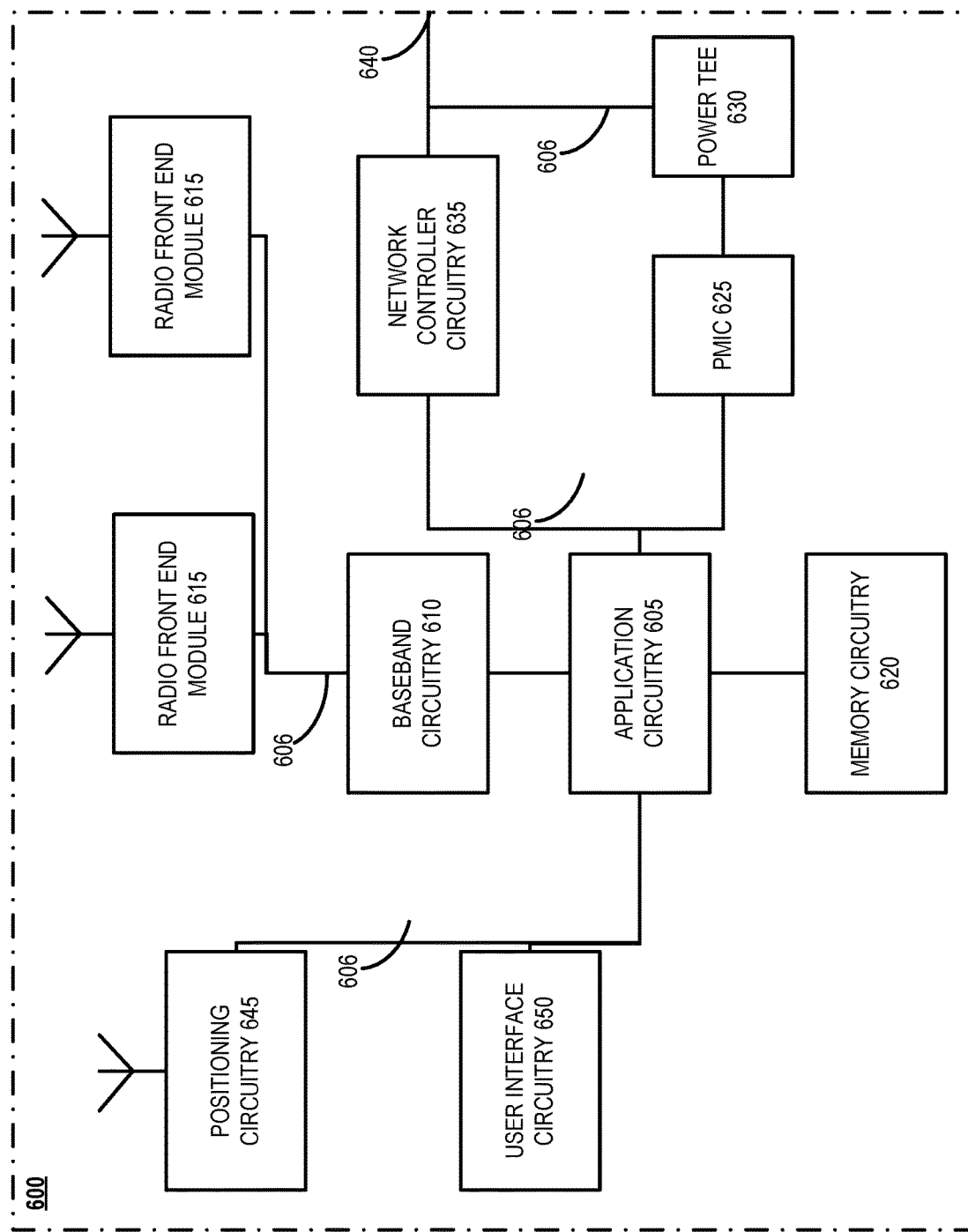
FIG. 6 illustrates an example infrastructure equipment in accordance with various embodiments.

FIG. 6 illustrates an example of infrastructure equipment 600 in accordance with various embodiments. The infrastructure equipment 600 (or "system 600") may be implemented as a base station, radio head, RAN node such as the RAN nodes 111 and/or AP 106 shown and described previously, application server(s) 130, and/or any other element/device discussed herein. In other examples, the system 600 could be implemented in or by a UE.

The system 600 includes application circuitry 605, baseband circuitry 610, one or more radio front end modules (RFEMs) 615, memory circuitry 620, power management integrated circuitry (PMIC) 625, power tee circuitry 630, network controller circuitry 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. The term "circuitry" as used herein refers to a circuit or system of multiple circuits configured to perform a particular function in an electronic device. The circuit or system of circuits may be part of, or include one or more hardware components, such as logic circuits, processor(s) (shared, dedicated, or group) and/or memory (shared, dedicated, or group), Integrated Circuits (ICs), Application-specific ICs (ASICs), Field Programmable Gate Arrays (FPGAs), Digital Signal Processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" as used herein refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" refers to one or more independent electronic circuits packaged onto a circuit board, FPGA, ASIC, SoC, SiP, etc., configured to provide a basic function within a computer system. A "module" may include a processor circuitry (shared, dedicated, or group) and/or memory circuitry shared, dedicated, or group), etc., that execute one or more software or firmware programs, a combinational logic circuit, and/or other suitable components that provide the described functionality. As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

Application circuitry 605 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 605 may comprise, or may be, a special-purpose processor/controller to operate according to the various embodiments herein. As examples, the processor(s) of application circuitry 605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 600 may not utilize application circuitry 605, and instead may include a special-purpose processor/controller to process IP data received from an EPC or 5GC, for example.

In some implementations, the application circuitry 605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs), programmable logic devices (PLDs), ASICs and/or structured ASICs, SoCs and/or programmable SoCs (PSoCs), and the like. In such implementations, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The baseband circuitry 610 includes one or more processing devices (e.g., baseband processors) to carry out various protocol and radio control functions. Baseband circuitry 610 may interface with application circuitry of system 600 for generation and processing of baseband signals and for controlling operations of the RFEMs 615. The baseband circuitry 610 may handle various radio control functions that enable communication with one or more radio networks via the RFEMs 615. The baseband circuitry 610 may include circuitry such as, but not limited to, one or more single-core or multi-core processors (e.g., one or more baseband processors) or control logic to process baseband signals received from a receive signal path of the RFEMs 615, and to generate baseband signals to be provided to the RFEMs 615 via a transmit signal path. In various embodiments, the baseband circuitry 610 may implement a RTOS to manage resources of the baseband circuitry 610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 615, which incorporates both mmWave antennas and sub-mmWave.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., RAN nodes 111, etc.), or the like.

The components shown by FIG. 6 may communicate with one another using interface circuitry 606 or IX 606, which may include any number of bus and/or IX technologies such as Industry Standard Architecture (ISA), extended ISA, inter-integrated circuit (I²C), Serial Peripheral Interface (SPI), point-to-point interfaces, power management bus (PMBus), Peripheral Component Interconnect (PCI), PCI express (PCIe), PCI extended (PCIx), Intel® Ultra Path Interconnect (UPI), Intel® Accelerator Link (IAL), Coherent Accelerator Processor Interface (CAPI), OpenCAPI™, Intel® QuickPath Interconnect (QPI), Intel® Omni-Path Architecture (OPA) IX, RapidIO™ system IXs, Cache Coherent Interconnect for Accelerators (CCIX), Gen-Z Consortium IXs, a HyperTransport IX, NVLink provided by NVIDIA®, and/or any number of other IX technologies. Additionally or alternatively, the IX technology may be a proprietary bus, for example, used in an SoC based system.

FIG. 7 illustrates an example of a platform 700 (or "device 700") in accordance with various embodiments. In embodiments, the computer platform 700 may be suitable for use as UEs 101, application servers 130, and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. Some of the components shown may be omitted, additional components may be present, and different arrangement of the components shown may occur in other implementations.

Application circuitry 705 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 605 may comprise, or may be, a special-purpose processor/controller to operate according to the various embodiments herein.

As examples, the processor(s) of application circuitry 705 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to Figure XT.

The RFEMs 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array XT111 of Figure XT infra), and the RFEM may be connected to multiple antennas. In alternative implementations, both mmWave and sub-mm-Wave radio functions may be implemented in the same physical RFEM 715, which incorporates both mmWave antennas and sub-mmWave.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 700 via the interface circuitry include sensor circuitry 721 and electro-mechanical components (EMCs) 722, as well as removable memory devices coupled to removable memory circuitry 723.

The sensor circuitry 721 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

The actuators 722, allow platform 700 to change its state, position, and/or orientation, or move or control a mechanism or system. The actuators 722 comprise electrical and/or mechanical devices for moving or controlling a mechanism or system, and converts energy (e.g., electric current or moving air and/or liquid) into some kind of motion. The actuators 722 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 722 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 700 may be configured to operate one or more actuators 722 based on one or more captured events and/or instructions or control signals received from a service provider and/or various client systems.

In some implementations, the interface circuitry may connect the platform 700 with positioning circuitry 745. The positioning circuitry 745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-PNT IC that uses a master timing clock to perform position tracking/estimation without GNSS assistance. The positioning circuitry 745 may also be part of, or interact with, the baseband circuitry 610 and/or RFEMs 715 to communicate with the nodes and components of the positioning network. The positioning circuitry 745 may also provide position data and/or time data to the application circuitry 705, which may use the data to synchronize operations with various infrastructure (e.g., radio base stations), for turn-by-turn navigation applications, or the like In some implementations, the interface circuitry may connect the platform 700 with Near-Field Communication (NFC) circuitry 740. NFC circuitry 740 is configured to provide contactless, short-range communications based on radio frequency identification (RFID) standards, wherein magnetic field induction is used to enable communication between NFC circuitry 740 and NFC-enabled devices external to the platform 700 (e.g., an "NFC touchpoint"). NFC circuitry 740 comprises an NFC controller coupled with an antenna element and a processor coupled with the NFC controller. The NFC controller may be a chip/IC providing NFC functionalities to the NFC circuitry 740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 740, or initiate data transfer between the NFC circuitry 740 and another active NFC device (e.g., a smartphone or an NFC-enabled POS terminal) that is proximate to the platform 700.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensor circuitry 721 and control and allow access to sensor circuitry 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in a UE 101.

In some embodiments, the PMIC 725 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC_Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, the power block 80 may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

The components shown by FIG. 7 may communicate with one another using interface circuitry 706 or IX 706, which may include any number of bus and/or IX technologies such as ISA, extended ISA, I²C, SPI, point-to-point interfaces, PMBus, PCI, PCIe, PCIx, Intel® UPI, Intel® IAL, Intel® CXL, CAPI, OpenCAPI, Intel® QPI, Intel® UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. Additionally or alternatively, the IX technology may be a proprietary bus, for example, used in an SoC based system.

FIG. 8 illustrates an example of communication circuitry 800 that may be used to practice the embodiments discussed herein. Components as shown by FIG. 8 are shown for illustrative purposes and may include other components not shown by FIG. 8, or the elements shown by FIG. 8 may by alternatively be grouped according to functions.

The communication circuitry 800 includes protocol processing circuitry 805, which operates or implements various protocol layers/entities of one or more wireless communication protocols. In one example, the protocol processing circuitry 805 may operate Long Term Evolution (LTE) protocol entities and/or Fifth Generation (5G)/New Radio (NR) protocol entities when the communication circuitry 800 is a cellular radiofrequency communication system, such as millimeter wave (mmWave) communication circuitry or some other suitable cellular communication circuitry. In this example, the protocol processing circuitry 805 would operate medium access control (MAC), radio link control (RLC), packet data convergence protocol (PDCP), service data adaptation protocol (SDAP), radio resource control (RRC), and non-access stratum (NAS) functions. In another example, the protocol processing circuitry 805 may operate one or more IEEE-based protocols when the communication circuitry 800 is WiFi communication system. In this example, the protocol processing circuitry 805 would operate MAC and logical link control (LLC) functions.

The protocol processing circuitry 805 may include one or more memory structures (not shown) to store program code and data information for operating the protocol functions, as well as one or more processing cores (not shown) to execute the program code and perform various operations using the data information. The protocol processing circuitry 805 may include one or more instances of control circuitry (not shown) to provide control functions for the digital baseband circuitry 810, transmit circuitry 815, receive circuitry 820, and/or radiofrequency (RF) circuitry 825. In some embodiments, the protocol processing circuitry 805 and/or the baseband circuitry 810 correspond to the baseband circuitry 610 and 710 of FIGS. 6 and 7, respectively.

The communication circuitry 800 also includes digital baseband circuitry 810, which implements physical layer (PHY) functions including hybrid automatic repeat request (HARQ) functions, scrambling and/or descrambling, (en)coding and/or decoding, layer mapping and/or demapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. The modulation/demodulation functionality may include Fast-Fourier Transform (FFT), precoding, or constellation mapping/demapping functionality. The encoding/decoding functionality may include convolution, tail-biting convolution, turbo, Viterbi, Low Density Parity Check (LDPC) coding, polar coding, etc. Embodiments of modulation/demodulation and encoder/decoder functionality are not limited to these examples and may include other suitable functionality in other embodiments.

Baseband processing circuitry 810 and/or protocol processing circuitry 805 may interface with an application platform (e.g., application circuitry 605 or application circuitry 705 of FIGS. 6 and 7, respectively) for generation and processing of baseband signals and for controlling operations of the RF circuitry 825. The digital baseband circuitry 810 may handle various radio control functions that enable communication with one or more radio networks via the RF circuitry 825. The digital baseband circuitry 810 may include circuitry such as, but not limited to, one or more single-core or multi-core processors (e.g., one or more baseband processors) or control logic to process baseband signals received from a receive signal path of the RF circuitry 825 (e.g., via Rx circuitry 820) and to generate baseband signals for a transmit signal path of the RF circuitry 825 (e.g., via Tx circuitry 815). The digital baseband circuitry 810 may comprise a multi-protocol baseband processor or the like.

As mentioned previously, the digital baseband circuitry 810 may include or implement encoder circuitry, which accepts input data, generates encoded data based on the input data, and outputs the encoded data to a modulation mapper. The encoder may also perform one or more of error detecting, error correcting, rate matching, and interleaving. The encoder may further include scrambling based on a scrambling sequence such as those discussed herein. The digital baseband circuitry 810 may include or implement a sequence generator to generate, for example, low Peak to Average Power Ratio (low-PAPR) sequences (see e.g., section 5.2.2 of 3GPP TS 38.211 v15.3.0 (2018 September) (hereinafter "TS 38.211"), pseudo-random noise (PN) sequences (see e.g., section 5.2.1 of TS 38.211), and/or reference signal sequences. In some embodiments, the sequence generator may be a part of the encoder circuitry.

The digital baseband circuitry 810 may include or implement a modulation mapper that takes binary digits as input (e.g., the encoded data from the encoder) and produces complex-valued modulation symbols as an output. The modulation mapper may operate one or more suitable modulation schemes, such as those discussed by, for example, section 5.1 of TS 38.211. The modulation mapper may map groups containing one or more binary digits, selected from the encoded data, to complex valued modulation symbols according to one or more mapping tables. The complex-valued modulation symbols may be input to a layer mapper to be mapped to one or more layer mapped modulation symbol streams (see e.g., sections 6.3.1.3 and 7.3.1.3 of TS 38.211). The one or more streams of layer mapped symbols may be input to precoder that generates one or more streams of precoded symbols, which may be represented as a block of vectors. The precoder may be configured to perform a direct mapping using a single antenna port, transmit diversity using space-time block coding, or spatial multiplexing. Each stream of precoded symbols may be input to a resource mapper that generates a stream of resource mapped symbols (e.g., REs). The resource mapper may map precoded symbols to frequency domain subcarriers and time domain symbols according to a mapping, which may include contiguous block mapping, randomized mapping, and/or sparse mapping according to a mapping code.

The digital baseband circuitry 810 may also include or implement a baseband signal generator (also referred to as a "multicarrier generator") to generate OFDM baseband signals and/or other baseband signals. In these embodiments, the resource mapped symbols from the resource mapper are input to the baseband signal generator which generates time domain baseband symbol(s). The baseband signal generator may generate a time domain signal (e.g., a set of time domain symbols) using, for example, an inverse discrete Fourier transform, commonly implemented as an inverse fast Fourier transform (IFFT) or a filter bank comprising one or more filters. The time-domain signal that results from the IFFT is transmitted across the radio channel. At the receiver, an FFT block is used to process the received signal and bring it into the frequency domain which is used to recover the original data bits. Other/additional aspects of the operation of the digital baseband circuitry 810 are discussed by TS 38.211.

The communication circuitry 800 also includes transmit (Tx) circuitry 815 and receive (Rx) circuitry 820. The Tx circuitry 815 is configured to convert digital baseband signals into analog signals for transmission by the RF circuitry 825. To do so, in one embodiment, the Tx circuitry 815 includes various components, such as digital to analog converters (DACs), analog baseband circuitry, up-conversion circuitry, and filtering and amplification circuitry. Additionally or alternatively, the Tx circuitry 815 may include digital transmit circuitry and output circuitry.

The Rx circuitry 820 is configured to convert analog signals received by the RF circuitry 825 into digital baseband signals to be provided to the digital baseband circuitry 810. To do so, in one embodiment, the Rx circuitry 820 includes parallel receive circuitry and/or one or more instances of combined receive circuitry. The parallel receive circuitry and instances of the combined receive circuitry may include Intermediate Frequency (IF) down-conversion circuitry, IF processing circuitry, baseband down-conversion circuitry, baseband processing circuitry, and analog-to-digital converter (ADC) circuitry.

The communication circuitry 800 also includes radiofrequency (RF) circuitry 825 to enable communication with wireless networks using modulated electromagnetic radiation through a non-solid medium. The RF circuitry 825 includes a receive signal path, which may include circuitry to convert analog RF signals (e.g., an existing or received modulated waveform) into digital baseband signals to be provided to the digital baseband circuitry 810 via the Rx circuitry 820. The RF circuitry 825 also includes a transmit signal path, which may include circuitry configured to convert digital baseband signals provided by the digital baseband circuitry 810 via the Tx circuitry 815 to be converted into analog RF signals (e.g., modulated waveform) that will be amplified and transmitted via the antenna array 830.

RF circuitry 825 may include one or more instances of radio chain circuitry, which may include one or more filters, power amplifiers, low noise amplifiers, programmable phase shifters, and power supplies (not shown). RF circuitry 825 may also include power combining and dividing circuitry. The power combining and dividing circuitry may operate bidirectionally, such that the same physical circuitry may be configured to operate as a power divider when the device is transmitting, and as a power combiner when the device is receiving. In some embodiments, the power combining and dividing circuitry may include wholly or partially separate circuitries to perform power dividing when the device is transmitting and power combining when the device is receiving. The power combining and dividing circuitry may include passive circuitry comprising one or more two-way power divider/combiners arranged in a tree. In some embodiments, the power combining and dividing circuitry may include active circuitry comprising amplifier circuits.

The communication circuitry 800 also includes antenna array 830. The antenna array 830 include one or more antenna elements. The antenna array 830 may be a plurality of microstrip antennas or printed antennas that are fabricated on the surface of one or more printed circuit boards. The antenna array 830 may be formed in as a patch of metal foil (e.g., a patch antenna) in a variety of shapes, and may be coupled with the RF circuitry 825 using metal transmission lines or the like.

Some non-limiting examples are as follows. The following examples pertain to further embodiments, and specifics in the examples may be used anywhere in one or more embodiments discussed previously. Any of the following examples may be combined with any other example or any embodiment discussed herein.

Example A01 includes a method of operating a System-on-Chip (SoC) to be implemented in a user equipment (UE), the method comprising: determining, by the SoC, at least one reference signal (RS) to be used for beam failure detection (BFD) based on a quasi co-location (QCL) of the RS with respect to another signal; and performing, by the SoC, the BFD using the determined RS.

Example A02 includes the method of example A01 and/or some other example(s) herein, wherein the RS is a Synchronization Signal Block (SSB), the SSB can only be configured in a bandwidth part (BWP) where a Control Resource Set (CORESET) 0 is configured, and the method further comprises: determining the SSB using an SSB index associated with the CORESET 0.

Example A03 includes the method of example A01 and/or some other example(s) herein, wherein the RS is an SSB, and the SSB is QCLed with a channel state information RS (CSI-RS) that is configured in a Transmission Configuration Indication (TCI) state of a CORESET.

Example A04 includes the method of example A03 and/or some other example(s) herein, wherein the CSI-RS configured in a TCI state of the CORESET is QCLed with a physical downlink control channel (PDCCH) according to a QCL typeD when two RSs are configured in the TCI state.

Example A05 includes the method of example A01 and/or some other example(s) herein, wherein the RS is an SSB, and, to determine the RS for BFD, the method further comprises: determining the SSB based on an SSB index indicated by a received Media Access Control (MAC) Control Element (CE).

Example A06 includes the method of example A01 and/or some other example(s) herein, wherein the RS is a CSI-RS, and, to determine the RS for BFD, the method further comprises: determining the CSI-RS based on a CSI-RS index indicated by a received MAC CE.

Example A07 includes the method of example A01 and/or some other example(s) herein, wherein, when the RS for BFD is explicitly configured by higher layers, and the RS for BFD is not QCLed with a demodulation RS (DMRS) of a PDCCH in an active BWP in a serving cell, the method further comprises: terminating or stopping performance of the BFD; and/or preventing transmission of a beam failure indication.

Example A08 includes the method of example A01 and/or some other example(s) herein, wherein, when the RS for BFD is explicitly configured by higher layers, and the RS for BFD is not QCLed with a demodulation RS (DMRS) of a PDCCH in an active BWP in a serving cell, the method further comprises: determining the RS for BFD to be CSI-RS; and determining CSI-RS resources to be monitored for the CSI-RS based on CSI-RS resources configuration indexes with same values as RS indexes indicated by a TCI state for respective CORESETs that are to be used to monitor the DMRS of the PDCCH.

Example A09 includes the method of example A01 and/or some other example(s) herein, wherein, when the RS for BFD is not explicitly configured by higher layers, the method further comprises: determining the RS for BFD to be a single port periodic CSI-RS; and determining CSI-RS resources to be monitored for the single port periodic CSI-RS based on CSI-RS resources configuration indexes with same values as RS indexes indicated by a TCI state for respective CORESETs.

Example A10 includes the method of example A01 and/or some other example(s) herein, wherein, when the RS for BFD is not explicitly configured by higher layers, the method further comprises: determining the RS for BFD to be an SSB or a CSI-RS QCLed with another CSI-RS configured in a TCI state for a CORESET when the other CSI-RS configured in the TCI state is not a single port periodic CSI-RS.

Example A11 includes the method of example A10 and/or some other example(s) herein, wherein the other CSI-RS is QCLed with either a periodic CSI-RS or an SSB.

Example A12 includes the method of examples A01-A11 and/or some other example(s) herein, wherein performing the BFD comprises: monitoring one or more resources in which the RS is to be transmitted; estimating a downlink (DL) radio link quality on the monitored one or more resources over an evaluation period; declaring a beam failure when a number of beam failure instance indications from a physical layer entity reaches a configured threshold before a configured timer expires, wherein the number of beam failure instance indications are based on the estimated DL radio link quality; and triggering a beam failure recovery procedure in response to declaration of the beam failure.

Example B01 includes a method to be performed by a user equipment (UE), the method comprising: determining, by the UE, at least one reference signal (RS) to be used for beam failure detection (BFD) based on a quasi co-location (QCL) of the RS with respect to another signal; and performing, by the UE BFD using the determined RS, wherein performing the BFD comprises: monitoring one or more resources in which the RS is to be transmitted; estimating a downlink (DL) radio link quality on the monitored one or more resources over an evaluation period; declaring a beam failure when a number of beam failure instance indications from a physical layer entity reaches a configured threshold before a configured timer expires, wherein the number of beam failure instance indications are based on the estimated DL radio link quality; and triggering a beam failure recovery procedure in response to declaration of the beam failure.

Example B02 includes the method of example B01 and/or some other example(s) herein, wherein determining the RS for BFD comprises: receiving, by the UE, a Media Access Control (MAC) Control Element (CE); and determining, by the UE, the RS based on an RS index indicated by the MAC CE.

Example B03 includes the method of example B02 and/or some other example(s) herein, wherein the RS is a Synchronization Signal Block (SSB), and the RS index indicated by the MAC CE is an SSB index.

Example B04 includes the method of example B03 and/or some other example(s) herein, wherein, when the SSB is only configured in a bandwidth part (BWP) where a Control Resource Set (CORESET) 0 is configured, the SSB index is associated with the CORESET 0.

Example B05 includes the method of example B03 and/or some other example(s) herein, wherein the SSB is QCLed with a channel state information RS (CSI-RS) that is configured in a Transmission Configuration Indication (TCI) state of a CORESET, and the CORESET is QCLed with a physical downlink control channel (PDCCH) according to a QCL typeD when two RSs are configured in the TCI state.

Example B06 includes the method of example B02 and/or some other example(s) herein, wherein the RS is a CSI-RS, and the RS index indicated by the MAC CE is an CSI-RS index.

Example B07 includes the method of example B06 and/or some other example(s) herein, wherein, when the RS for BFD is explicitly configured by higher layers, and the RS for BFD is not QCLed with a demodulation RS (DMRS) of a PDCCH in an active BWP in a serving cell, the method comprises: determining, by the UE, CSI-RS resources to be monitored for the CSI-RS based on CSI-RS resources configuration indexes with same values as RS indexes indicated by a TCI state for respective CORESETs that are to be used to monitor the DMRS of the PDCCH.

Example B08 includes the method of example B06 and/or some other example(s) herein, wherein, when the RS for BFD is not explicitly configured by higher layers, and the CSI-RS is a single port periodic CSI-RS, the method comprises: determining, by the UE, CSI-RS resources to be monitored for the single port periodic CSI-RS based on CSI-RS resources configuration indexes with same values as RS indexes indicated by a TCI state for respective CORESETs.

Example B09 includes the method of example B03, B06, and/or some other example(s) herein, wherein, when the RS for BFD is not explicitly configured by higher layers, the method comprises: determining, by the UE, the RS for BFD to be an SSB or a CSI-RS QCLed with another CSI-RS configured in a TCI state for a CORESET when the other CSI-RS configured in the TCI state is not a single port periodic CSI-RS, wherein the other CSI-RS is QCLed with either a periodic CSI-RS or an SSB.

Example B10 includes the method of example B03 or B06 and/or some other example(s) herein, wherein, when the RS for BFD is explicitly configured by higher layers, and the RS for BFD is not QCLed with a DMRS of a PDCCH in an active BWP in a serving cell, the method comprises: terminating or stopping, by the UE, performance of the BFD; and/or preventing, by the UE, transmission of a beam failure indication.

Example C01 includes a method to be performed by a user equipment (UE), the method comprising: determining a reference signal (RS) to be used for beam failure detection (BFD) based on a quasi co-location (QCL) relationship between the RS and at least one channel state information RS (CSI-RS) or a demodulation RS (DMRS) of a physical downlink control channel (PDDCH); and performing the BFD using the determined RS.

Example C02 includes the method of example C01 and/or some other example(s) herein, wherein the RS is a Synchronization Signal Block (SSB), and the SSB is QCLed with the CSI-RS, and the CSI-RS is configured in Transmission Configuration Indication (TCI) state of a core resource set (CORESET).

Example C03 includes the method of example C01 and/or some other example(s) herein, wherein, when the RS for BFD is not explicitly configured by higher layer signaling, and determining the RS for BFD comprises: determining the RS to be a single port periodic CSI-RS configured in a TCI state for a CORESET; or determining the RS to be an SSB or a single port periodic CSI-RS QCLed with a CSI-RS configured in TCI state for CORESET.

Example Z01 may include an apparatus comprising means to perform one or more elements of a method described in or related to any of examples A01-A12, B01-B10, C01-C03, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A01-A12, B01-B10, C01-C03, or any other method or process described herein.

Example Z03 may include an apparatus comprising logic, modules, or circuitry to perform one or more elements of a method described in or related to any of examples A01-A12, B01-B10, C01-C03, or any other method or process described herein.

Example Z04 may include a method, technique, or process as described in or related to any of examples A01-A12, B01-B10, C01-C03, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A01-A12, B01-B10, C01-C03, or portions thereof.

Example Z06 may include a signal as described in or related to any of examples A01-A12, B01-B10, C01-C03, or portions or parts thereof.

Example Z07 may include a datagram, packet, frame, segment, protocol data unit (PDU), or message as described in or related to any of examples A01-A12, B01-B10, C01-C03, or portions or parts thereof, or otherwise described in the present disclosure.

Example Z08 may include a signal encoded with data as described in or related to any of examples A01-A12, B01-B10, C01-C03, or portions or parts thereof, or otherwise described in the present disclosure.

Example Z09 may include a signal encoded with a datagram, packet, frame, segment, protocol data unit (PDU), or message as described in or related to any of examples A01-A12, B01-B10, C01-C03, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A01-A12, B01-B10, C01-C03, or portions thereof.

Example Z11 may include a computer program comprising instructions, wherein execution of the program by a processing element is to cause the processing element to carry out the method, techniques, or process as described in or related to any of examples A01-A12, B01-B10, C01-C03, or portions thereof.

Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein.

Any of the above-described examples may be combined with any other example (or combination of examples), unless explicitly stated otherwise. The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous. The term "coupled" (or variants thereof) may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "communicatively coupled" may mean that two or more elements may be in contact with one another by a means of communication including through a wire or other interconnect connection, through a wireless communication channel or ink, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A user equipment (UE) comprising:
   interface circuitry; and
   baseband circuitry coupled with the interface circuitry, wherein the baseband circuitry is configured to:
   determine whether a reference signal (RS) to be used for beam failure detection (BFD) is configured by higher layers and whether the RS for BFD is quasi co-located (QCLed) with a demodulation RS (DMRS) of a physical downlink control channel (PDCCH);
   in response to the determination that the RS for BFD is configured by higher layers and the RS for BFD is not QCLed with the DMRS, determine the RS for BFD to be a channel state information RS (CSI-RS) configured in a transmission configuration indication (TCI) state of the DMRS; and
   perform BFD using the RS.

2. The UE of claim 1, wherein the baseband circuitry is further configured to:
   in response to the determination that the RS for BFD is configured by higher layers and the RS for BFD is QCLed with the DMRS, determine the RS to be a Synchronization Signal Block (SSB), the SSB only configured in a bandwidth part (BWP) where a Control Resource Set (CORESET) 0 is configured; and
   determine the SSB using an SSB index associated with the CORESET 0.

3. The UE of claim 1, wherein the baseband circuitry is further configured to:
   in response to the determination that the RS for BFD is configured by higher layers and the RS for BFD is QCLed with the DMRS, determine the RS to be a Synchronization Signal Block (SSB), wherein the SSB is QCLed with a CSI-RS that is configured in a TCI state of a Control Resource Set (CORESET).

4. The UE of claim 1, wherein the baseband circuitry is further configured to:
   in response to the determination that the RS for BFD is configured by higher layers and the RS for BFD is QCLed with the DMRS, determine the RS to be a Synchronization Signal Block (SSB); and
   determine the SSB based on an SSB index indicated by a received Media Access Control (MAC) Control Element (CE).

5. The UE of claim 1, wherein, the baseband circuitry is further configured to:
   determine the CSI-RS based on a CSI-RS index indicated by a received Media Access Control (MAC) Control Element (CE).

6. The UE of claim 1, wherein the baseband circuitry is further configured to:
   determine CSI-RS resources to be monitored for the CSI-RS based on CSI-RS resources configuration indexes with same values as RS indexes indicated by a TCI state for respective Control Resource Sets (CORESETs) that are to be used to monitor the DMRS.

7. The UE of claim 1, wherein the baseband circuitry is further configured to:
   in response to the determination that the RS for BFD is not explicitly configured by higher layers, determine the RS for BFD to be a single port periodic CSI-RS; and
   determine CSI-RS resources to be monitored for the single port periodic CSI-RS based on CSI-RS resources configuration indexes with same values as RS indexes indicated by a TCI state for respective Control Resource Sets (CORESETs).

8. The UE of claim 1, wherein the baseband circuitry is further configured to:
in response to the determination that the RS for BFD is not explicitly configured by higher layers, determine the RS for BFD to be a Synchronization Signal Block (SSB) or a CSI-RS QCLed with another CSI-RS configured in a TCI state for a Control Resource Set (CORESET) when the other CSI-RS configured in the TCI state is not a single port periodic CSI-RS.

9. One or more non-transitory computer-readable storage media (CRSM) comprising instructions, wherein execution of the instructions by one or more processors cause a user equipment (UE) to:
determine whether a reference signal (RS) to be used for beam failure detection (BFD) is configured by higher layers and whether the RS for BFD is quasi co-located (QCLed) with a demodulation RS (DMRS) of a physical downlink control channel (PDCCH);
in response to the determination that the RS for BFD is configured by higher layers and the RS for BFD is not QCLed with the DMRS, determine the RS for BFD to be a channel state information RS (CSI-RS) configured in a transmission configuration indication (TCI) state of the DMRS; and
perform BFD using the RS, wherein to perform the BFD, execution of the instructions is to cause the UE to:
monitor one or more resources in which the RS is to be transmitted;
estimate a downlink (DL) radio link quality on the one or more resources over an evaluation period;
declare a beam failure when a number of beam failure instance indications from a physical layer entity reaches a configured threshold before a configured timer expires, wherein the number of beam failure instance indications are based on the DL radio link quality; and
trigger a beam failure recovery procedure in response to declaration of the beam failure.

10. The one or more non-transitory CRSM of claim 9, wherein execution of the instructions cause the UE to:
receive a Media Access Control (MAC) Control Element (CE); and
determine the RS based on an RS index indicated by the MAC CE.

11. The one or more non-transitory CRSM of claim 10, wherein execution of the instructions cause the UE to:
in response to the determination that the RS for BFD is configured by higher layers and the RS for BFD is QCLed with the DMRS, determine the RS to be a Synchronization Signal Block (SSB), wherein the RS index indicated by the MAC CE is an SSB index.

12. The one or more non-transitory CRSM of claim 11, wherein, when the SSB is only configured in a bandwidth part (BWP) where a Control Resource Set (CORESET) 0 is configured, the SSB index is associated with the CORESET 0.

13. The one or more non-transitory CRSM of claim 11, wherein the SSB is QCLed with a CSI-RS that is configured in a TCI state of a Control Resource Set (CORESET), and the CORESET is QCLed with a PDCCH according to a QCLed typeD when two RSs are configured in the TCI state.

14. The one or more non-transitory CRSM of claim 10, wherein the RS index indicated by the MAC CE is a CSI-RS index.

15. The one or more non-transitory CRSM of claim 14, wherein execution of the instructions cause the UE to:
determine CSI-RS resources to be monitored for the CSI-RS based on CSI-RS resources configuration indexes with same values as RS indexes indicated by a TCI state for respective Control Resource Sets (CORESETs) that are to be used to monitor the DMRS of the PDCCH.

16. The one or more non-transitory CRSM of claim 9, wherein execution of the instructions cause the UE to:
in response to the determination that the RS for BFD is not explicitly configured by higher layers, determine the RS for BFD to be a single port periodic CSI-RS; and
determine CSI-RS resources to be monitored for the single port periodic CSI-RS based on CSI-RS resources configuration indexes with same values as RS indexes indicated by a TCI state for respective Control Resource Sets (CORESETs).

17. A user equipment (UE) comprising:
means for determining whether a reference signal (RS) to be used for beam failure detection (BFD) is configured by higher layers and whether the RS for BFD is quasi co-located (QCLed) with a demodulation RS (DMRS) of a physical downlink control channel (PDCCH);
means for, in response to the determination that the RS for BFD is configured by higher layers and the RS for BFD is not quasi co-located (QCLed) with the DMRS, determining the RS for BFD to be a channel state information RS (CSI-RS) configured in a Transmission Configuration Indication (TCI) state of the DMRS; and
means for performing the BFD using the RS.

18. The UE of claim 17, further comprising:
means for, in response to the determination that the RS for BFD is configured by higher layers and the RS for BFD is QCLed with the DMRS, determining the RS to be a Synchronization Signal Block (SSB), wherein the SSB is QCLed with the CSI-RS, and the CSI-RS is configured in Transmission Configuration Indication (TCI) state of a core resource set (CORESET).

19. The UE of claim 17, wherein, further comprising:
in response to the determination that the RS for BFD is not explicitly configured by higher layer signaling, means for determining the RS to be a single port periodic CSI-RS configured in a TCI state for a CORESET; or
means for determining the RS to be a Synchronization Signal Block (SSB) or a single port periodic CSI-RS QCLed with a CSI-RS configured in TCI state for CORESET.

* * * * *